United States Patent [19]

Ueda et al.

[11] 4,151,862

[45] May 1, 1979

[54] MULTIPLE-MODE FLUID-FLOW CONTROL VALVE ARRANGEMENT

[75] Inventors: Yasukiyo Ueda; Keiichi Mori; Keijiro Mori, all of Kadoma, Japan

[73] Assignee: Matsushita Electric Industrial Co., Ltd., Japan

[21] Appl. No.: 870,123

[22] Filed: Jan. 17, 1978

Related U.S. Application Data

[62] Division of Ser. No. 674,305, Apr. 6, 1976, Pat. No. 4,085,921.

[30] Foreign Application Priority Data

Apr. 9, 1975 [JP] Japan ................................ 50-43658
Aug. 18, 1975 [JP] Japan ................................ 50-100401

[51] Int. Cl.² .......................... F16K 1/44; F16K 31/04
[52] U.S. Cl. ...................................... 137/629; 251/129
[58] Field of Search .................. 137/516.27, 629, 630; 251/129

[56] References Cited

U.S. PATENT DOCUMENTS 3,788,312   1/1974   Sandstrom .................. 137/516.27

*Primary Examiner*—Robert G. Nilson
*Attorney, Agent, or Firm*—Robert E. Burns; Emmanuel J. Lobato; Bruce L. Adams

[57] ABSTRACT

A fluid-flow control valve arrangement comprising valve means operable in different conditions including variable-flow, constant-flow and zero-flow mode conditions depending upon predetermined ranges of a prescribed operational parameter, the valve arrangement being useful especially for the control of the flow of fuel in a heating device such as a gas-burning water heating device.

12 Claims, 21 Drawing Figures

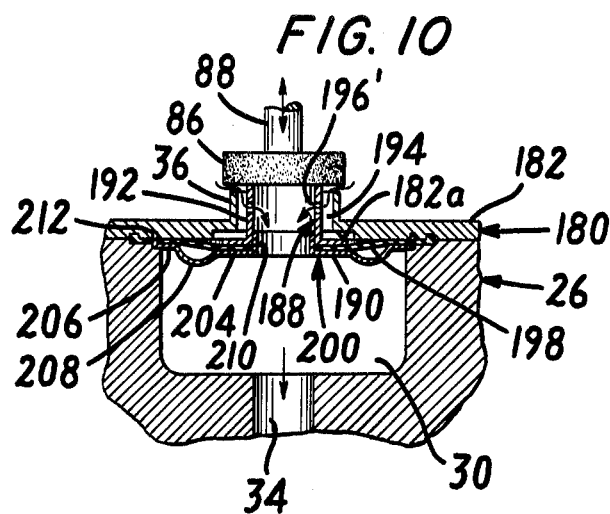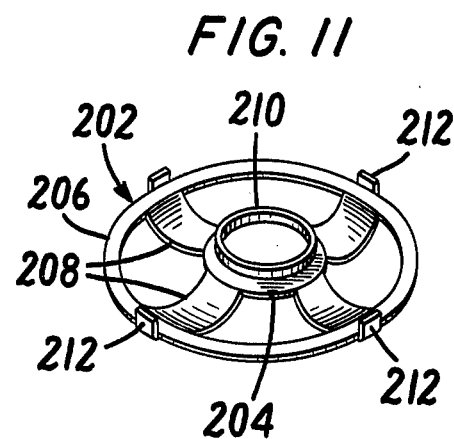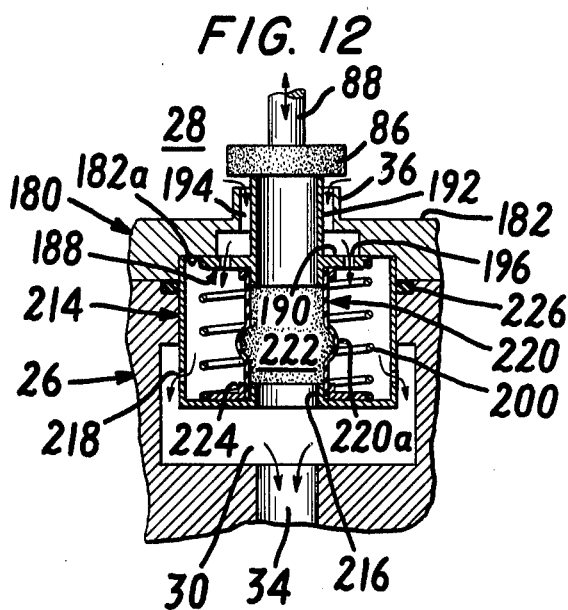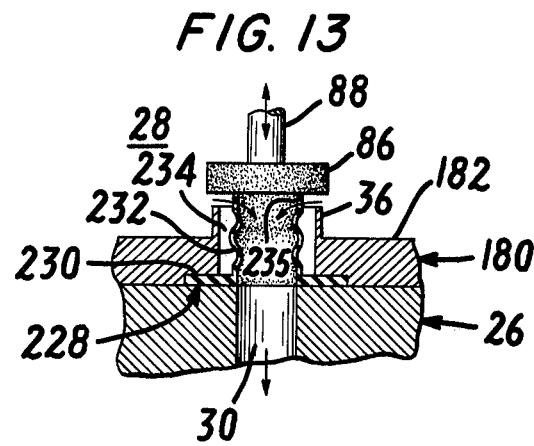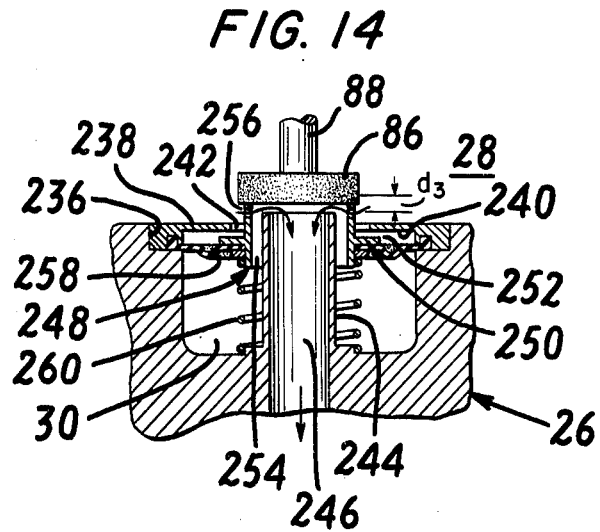

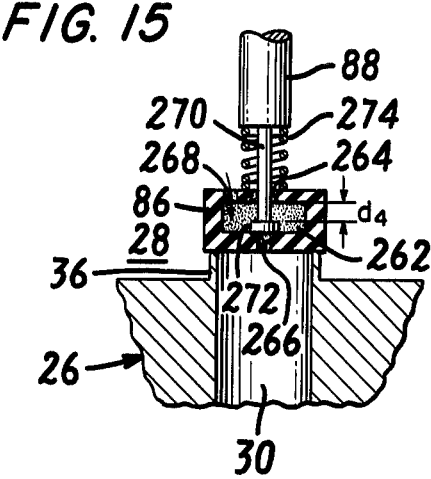
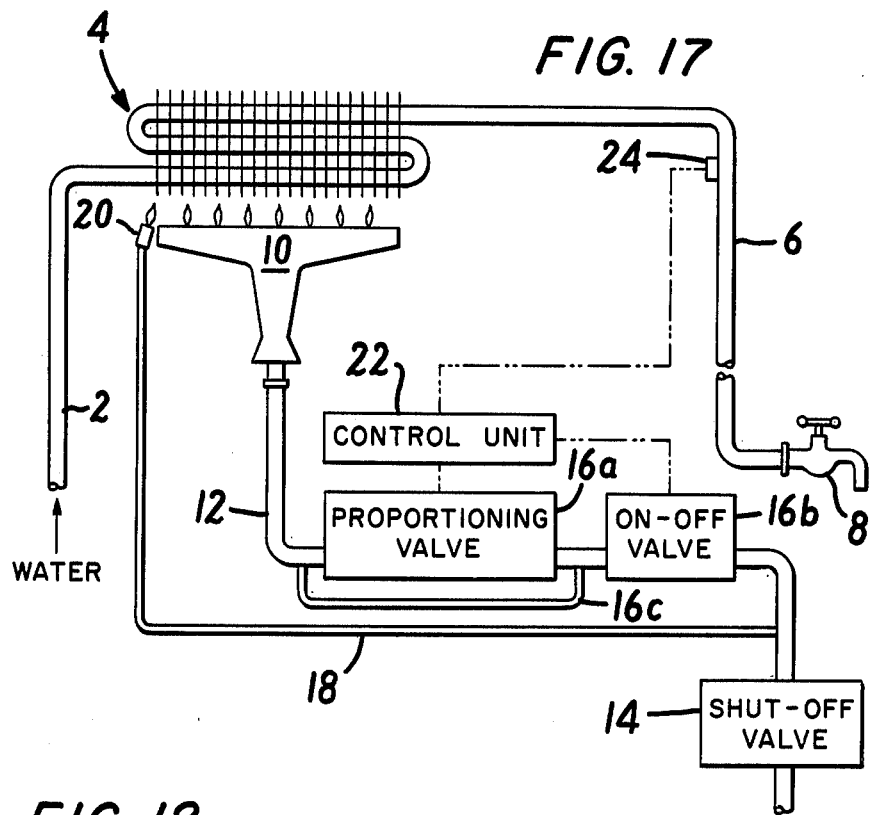
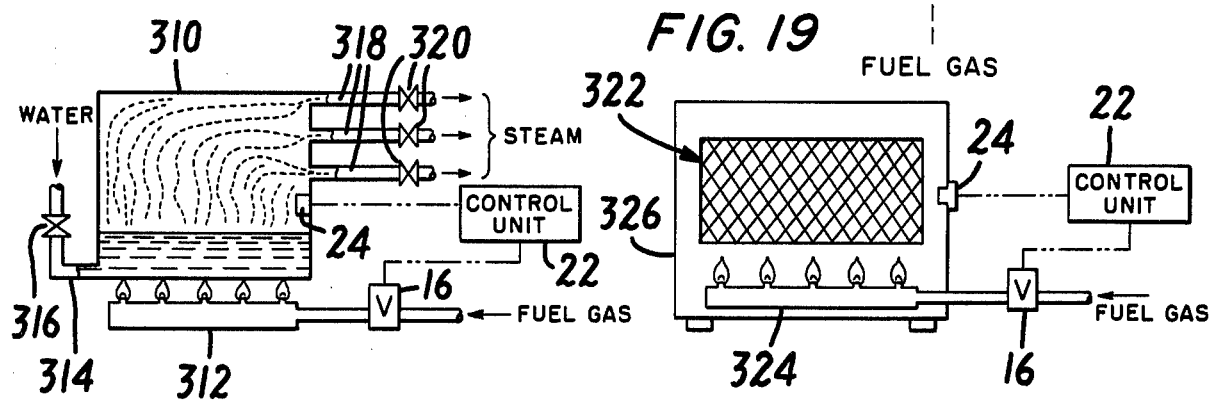

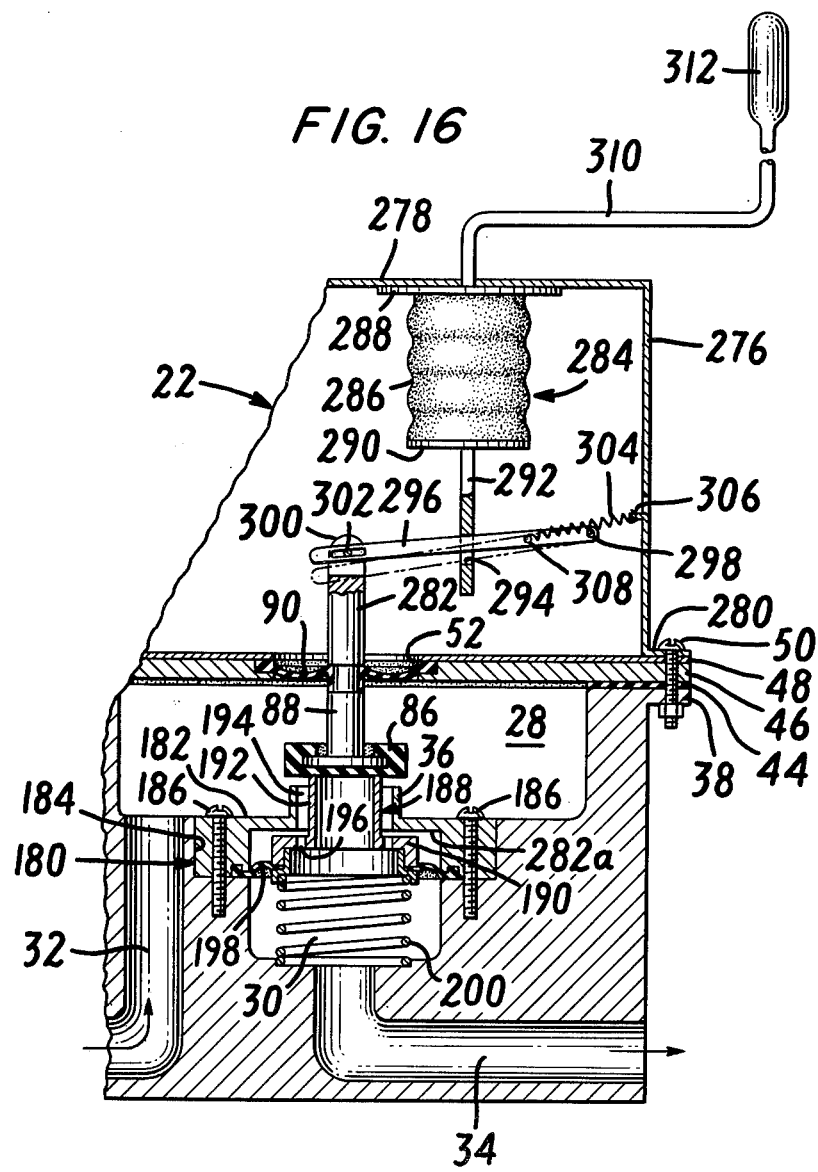

MULTIPLE-MODE FLUID-FLOW CONTROL VALVE ARRANGEMENT

This is a divisional of application Ser. No. 674,305, filed Apr. 6, 1976, now U.S. Pat. No. 4,085,921.

The present invention relates to valve arrangements for controlling the flows of fluid such as fuel gas in gas-burning water heating devices, cooking appliances, space heaters, steam boilers and infrared heaters.

Known fuel gas flow control valves for use in these devices are categorized as two major types. One type of valve is arranged to have fully open and fully closed conditions and is alternately actuated between these conditions on the basis of a signal representative of variation in a suitable operational variable such as the temperature of water heated by a gas-burning water heating device. The other type of valve is also arranged to have fully open and fully closed conditions but is continuously operated between these conditions so that the flow rate of fuel gas through the valve is controlled in proportion to the magnitude of the signal supplied to the valve. Drawbacks of the former type of valve include fluctuations in the flow rate due to hunting of the valve element and wear of the valve element and the valve seat due to the repeated collisions encountered therebetween. The collisions between the valve element and the valve seat are causative of production of noises. These drawbacks are eliminated in the latter type of valve, which however has the following drawbacks.

One of the important design considerations of valves for controlling the flow rates of fuels in general is to maintain the flow rate of the fuel above a predetermined limit to assure proper combustion of the fuel when the valve is open. If the flow rate of the fuel through the valve becomes lower than such a limit, the fuel may fail to be fired or may be incompletely combusted to produce toxic carbon monoxide. A prior art valve of the continuously operable type is therefore designed to automatically shut off the flow of fuel when the flow rate of the fuel through the valve is reduced to a predetermined level. Difficulties are however encountered in manufacturing the valve capable of operating precisely in accordance wih the designed schedules and, as a result, the critical level at which the valve is to be closed varies from one valve to another especially when the valves are manufactured on a large-scale commercial basis. Even if the valve could be operated as designed, a problem is still experienced because of the fluctuations in the flow rate as caused during an incipient stage after the delivery of the fuel through the valve is re-opened. The present invention contemplates elimination of all these drawbacks that have been inherent in prior art valves of both two-position type and continuously operable or proportioning type.

SUMMARY OF THE INVENTION

In accordance with the present invention, there is provided a multiple-mode fluid-flow control valve arrangement which comprises valve means operable in different conditions including a variable-flow mode condition passing fluid therethrough at a rate continuously variable between predetermined minimum and maximum values, a constant-flow mode condition passing the fluid therethrough at a fixed rate equal to the above mentioned minimum value and a zero-flow mode condition interrupting the flow of the fluid therethrough, signal generating means for producing an analog signal representative of variation of a prescribed operational variable, and control means responsive to the signal for operating the valve means between the above described different conditions depending upon predetermined ranges of the analog signal.

BRIEF DESCRIPTION OF THE DRAWINGS

The features of the valve arrangement according to the present invention will become more apparent from the following description in which like reference numerals and characters designate corresponding parts, elements, unuts and structures in some figures and in which:

FIG. 10 is a fragmentary vertical sectional view showing portions of a further modification of the valve unit of FIG. 8;

FIG. 11 is a perspective view of a spring element incorporated into the valve unit of FIG. 10;

FIGS. 12, 13, 14 and 15 are fragmentary vertical sectional views showing other modifications of the valve unit of FIG. 8;

FIG. 16 is a fragmentary vertical sectional view showing still another modification of the valve unit illustrated in FIG. 8;

FIG. 17 is a view similar to FIg. 3 but shows another embodiment of the multiple-mode fluid-flow conttol arrangement according to the present invention;

FIG. 18 is a schematic view showing a hot-water steam boiler incorporating a valve arrangement embodying the present invention; and FIG. 19 is a schematic view showing an infrared space heating appliance incorporating a valve arrangement embodying the present invention.

Referring to the drawings, FIG. 1 illustrates the performance characteristics of a prior art multiple-mode fluid-flow control valve. The valve is assumed to be of the type which is used to regulate the flow of fuel gas to be supplied to a gas-burning water heating device and, thus, the performance characteristics of the valve are indicated in terms of the relationship between the temperature of water passed through the heating device and the flow rate of the fuel gas passed through the valve. The valve is arranged to provide different modes of operation depending upon predetermined ranges of temperature of water heated by the heating device and is shifted between a maximum-flow mode condition W, a variable-flow mode condition X and a zero-flow mode condition Z. The maximum-flow mode condition W is the condition in which the valve is fully open and the fuel gas is allowed to flow through the valve at a maximum rate $F_1$ which is inherent in the valve. When the temperature of water heated by and being discharged from the heating device is lower than a predetermined level To, the valve varies the flow of fuel gas proportionately with the temperature of the hot water being deschared from the heating device between the above mentioned maximum rate $F_1$ and a predetermined minimum value $F_2$, providing the variable-flow mode condition X. At an instant when the temperature of water reaches the predetermined level To, the valve is fully closed and shuts of the flow of fuel gas therethrough, establishing the zero-flow mode condition Z. The minimum value $F_2$ of the flow rate is selected in such a manner as to assure the fuel gas to be continuously combusted in stable condition so that extinction of fire and production of carbon monoxide can be prevented. From the practical view point, however, extreme difficulties are encountered in precisely controlling the accuracy of the valve $F_2$ on the part of the manufacturer of the valve and maintaining the accuracy during use of the heating device. If, thus, it happens that the minimum flow rate of fuel gas through the valve is set at a value $F_3$ which is lower than the theoretical value $F_2$, the fuel gas will tend to be combusted incompletely or, in the worst case, may be misfired. If, conversely, the actual minimum flow rate is set at a value $F_4$ higher than the theoretical valve $F_2$, then the temperature range providing the variable-flow mode condition X is narrowed and, as a consequence, the heating device becomes unable to produce the desired performance characteristics.

FIG. 2 shows variation of the temperature of water heated by the heating device until the temperature reaches a certain target level Ts which corresponds to a certain rate of flow of the water to be discharged from the heating device during use. During an incipient stage after the heating device has been manipulated to provide such a flow rate of water, the temperature of the water discharged from the device minutely fluctuates across the level Ts until the temperature is finally damped to the target level Ts. This is due to the delay in actuating the fuel-gas control valve after the temperature of water heated is detected by a temperature sensor. The range of such fluctuations in the temperature of water is the broader as the load on the heating device becomes smaller, viz., as the flow rate of water through the device is made lower. If, thus, the flow rate of fuel gas through the valve is set at a value Fs corresponding to the temperature Ts within the range providing the variable-flow mode condition X as indicated in the graph of FIG. 1, the temperature of water fluctuating across the certain level Ts may happen to instantaneously rise beyond the vertical level To between the temperature ranges providing the variable-flow and zero-flow mode conditions X and Z especially if the temperature level Ts is in the vicinity of the critical level To. When this occurs, the valve is shifted from the variable flow mode condition X to the zero-flow mode condition Z and shut off the flow of fuel gas even though the target level Ts of the water temperature is lower than the critical level To. At a certain point of time after the supply of fuel gas is thus interrupted and consequently the temperature of water is reduced, the valve will re-open and resume the variable-flow mode condition X in an attempt to raise the water temperature toward the target level Ts. The temperatures of water is caused to fluctuate again as indicated in FIG. 2 and may instantaneously rise beyond the critical level To above the target level Ts, causing the valve to close for a second time. If such phenomena are repeated over and over again, the valve will frequently be shifted between variable-flow and zero-flow mode conditions X and Z and will be disabled from establishing the variable-flow mode condition X although the target level Ts of the water temperature is lower than the critical level To.

The purpose of the present invention is to provide a useful solution to all these problems. FIG. 3 illustrates a gas-burning water heating device of a quick recovery, "instantaneous" type incorporating a valve arrangement according to the present invention to achieve such a purpose.

Referring to FIG. 3, the gas-burning water heating device comprises a water feed pipe 2 which leads through a heat exchanger 4 to a hot-water discharge pipe 6 terminating in a discharge valve or cock 8. A gas burning unit 10 with a plurality of fuel-gas dicharge nozzles (not shown) is positioned below the heat exchanger 4. The nozzles are in communication with a fuel-gas feed pipe 12 provided with a manually-operated flow shut-off valve unit 14 and an automatically-operated flow control valve unit 16 located downstream of the flow shut-off valve unit 14. A branch pipe 18 leads from the fuel-gas feed pipe 12 downstream of the shut-off valve unit 14 and upstream of the flow control valve unit 16 and terminates in a pilot nozzle 20 which is open in proximity to the discharge nozzle in the gas burning unit 10. The fuel-gas flow control valve unit 16 is operated by means of a suitable control unit 22 and temperature-sensitive signal generating means 24. The signal generating means 24 is in heat conductive contact with the hot-water discharge pipe 24 and is operative to produce a signal representative of the temperature of the hot water being passed through the pipe 24. The control unit 22 operates of the basis of the signal thus delivered from the signal generating means 24 so that, when the flow shut-off valve unit 14 is open, the flow control valve unit 16 is operated by the control unit 22 so as to regulate the flow of the fuel gas through the valve unit 16. As the flow of fuel gas through the flow control valve unit 16 is thus regulated depending upon the temperature of hot water being delivered from the descharge pipe 6 with the cock 8 open, the quantity of the heat generated by the gas burning unit 10 is varied and accordingly the water being passed through the heat exchanger 4 is heated to a temperature which varies with the flow rate of water through the heat exchanger 4 and the qunatity of heat transferred from the gas burning unit 10, viz., the flow rate of fuel gas through the flow control valve unit 16.

FIG. 4 is a graphic representation of the schedule in accordance with which the valve unit 16 is to be operated depending upon the temperature of hot water as detected by the signal generating means 32. Referring to FIg. 4, the valve unit 24 has four different modes of operation consisting of a maximum-flow mode condition W, a variable-flow mode condition X, a constant-flow mode condition Y, and a zero-flow mode condition Z. When operating in the maximum-flow mode condition W, the valve unit 16 fully open and allows the fuel gas to pass therethrough a maximum rate Fm which is dictated by the specific mechanical construction and arrangement of the valve unit. The valve unit 16 is assumed to be in the condition establishing the maximum-flow mode W when the water temperature detected by the signal generating means 24 is lower than a predetermined level Tm. When the water temperature detected by the signal generating means 24 is between the value Tm and a predetermined first critical level Tp higher than the level Tm, the valve unit 16 is operated in the variable-flow mode condition X and controls the flow rate of the fuel gas to vary substantially proportionately with the hot water temperature between the above mentioned maximum value Fm and a predetermined minimum value Fc as indicated by line OP. The value Fc is selected to insure complete combustion of the fuel gas supplied to the gas burning unit 10 (FIG. 3) at such a rate. When the hot water temperature is increased beyond the first critical level Tp but remains lower than a predetermined second critical level Tq, the valve unit 16 is held in the constant-flow mode condition Y passing the fuel gas therethrough at the fixed rate Fc as indicated by line PQ. At an instant when the hot water temperature reaches the second critical level Tq, the valve unit 16 is caused to fully close and interrupts the flow of the fuel gas therethrough as indicated by line QQ', providing the zero-flow mode condition Z. The valve unit 16 is held closed and is thus maintained in the zero-flow mode condition Z until the hot water temperature is reduced to a predetermined third critical level Tr between the first and second critical levels Tp and Tq, as indicated by line Q'R. When the hot water temperature reaches the third critical level Tr, the valve unit 16 is allowed to re-open, viz., shifted back from the zero-flow mode condition Z to the constant-flow mode condition Y as indicated by line RR' and passes the fuel gas therethrough at the fixed rate Fc. If, in this instance, the flow rate of water passed through the heat exchanger 4 (FIG. 3) is kept unchanged or reduced, the temperature of the hot water passed through the discharge pipe 6 rises for a second time from the third critical level Tr and the valve unit 16 is maintained in the constant-flow mode condition Y until the hot water temperature reaches the second critical level Tq. The valve unit 16 is, in this fashion, operated to provide the performance characteristics following the closed loop Q-Q'-R-R'-Q and is alternately shifted between the constant-flow and zero-flow mode conditions Y and Z if the flow rate of water through the heat exchanger 4 of the device shown in FIG. 3 is maintained within such a range as to keep the hot water temperature above the first critical level Tp. If, however, the hot water temperature is lowered below the first critical level Tp, the valve unit 16 is shifted from the constant-flow mode condition Y to the variable-flow mode condition X until the flow rate of water through the heat exchanger 4 reaches the maximum value Fm. To assure the firing of the fuel gas supplied to the gas burning unit 10 through the valve unit 16 which is re-opened from the fully closed condition, the valve unit 16 may be operated to be made fully open temporarily when the valve unit 16 is shifted from the zero-flow mode condition Z to the constant-flow mode condition Y in response to the water temperature reduced to the third critical level Tr, as indicated by line R'R" of the plot shown in FIG. 4.

Figure 3:
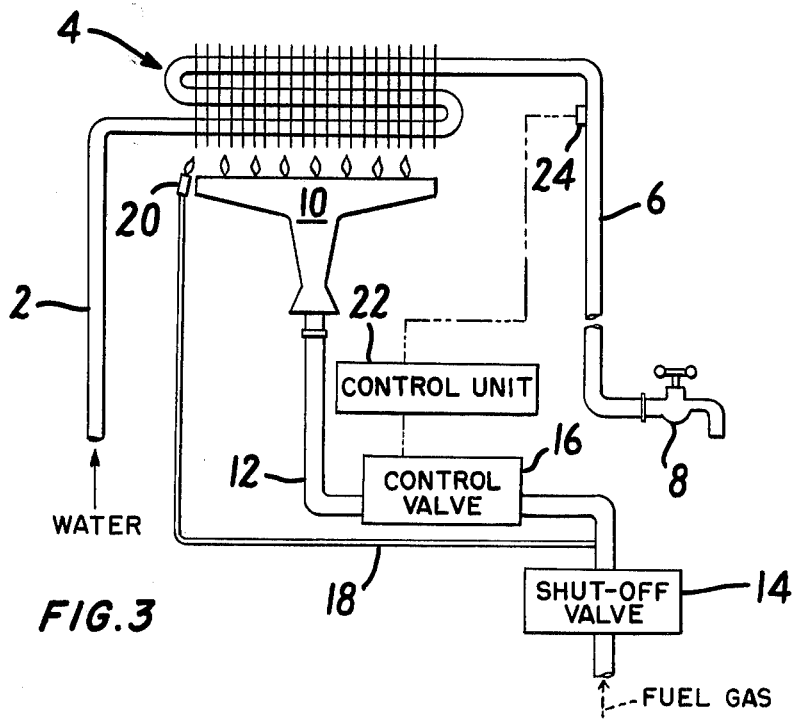
FIG. 3 is a schematic view showing a gas-burning water heating device incorporating a multiple-mode fluid-flow control valve arrangement according to the present invention.

In the gas-burning water heating device illustrated in FIG. 3, the valve arrangement according to the present invention is composed of the flow control valve unit 16, control unit 22 and signal generating means 24. The control unit 22 may be constituted by an electric circuit with the signal generating means 24 arranged to produce an electrical signal representative of the detected water temperature or by a mechanism responsive to variation in the pressure of a suitable fluid with the signal generating means 24 connected in a heat conductive fashion to the control unit 22.

Figure 5:
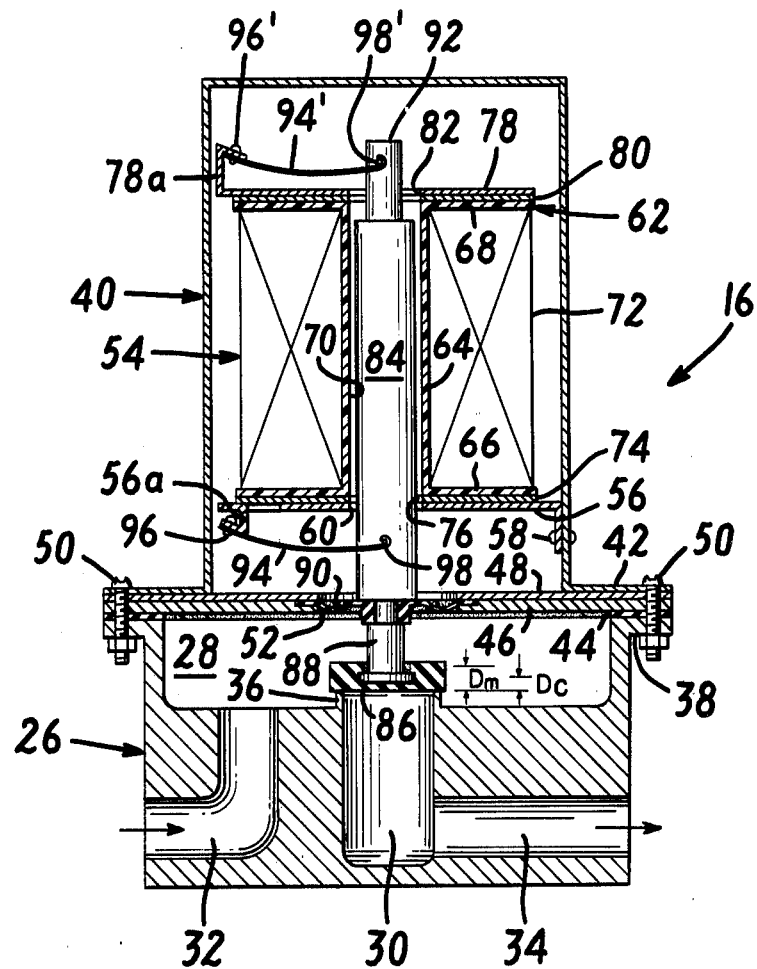
FIG. 5 is a vertical sectional view of a solenoid-operated valve unit forming part of the valve arrangement shown in FIG. 3.
Figure 6:
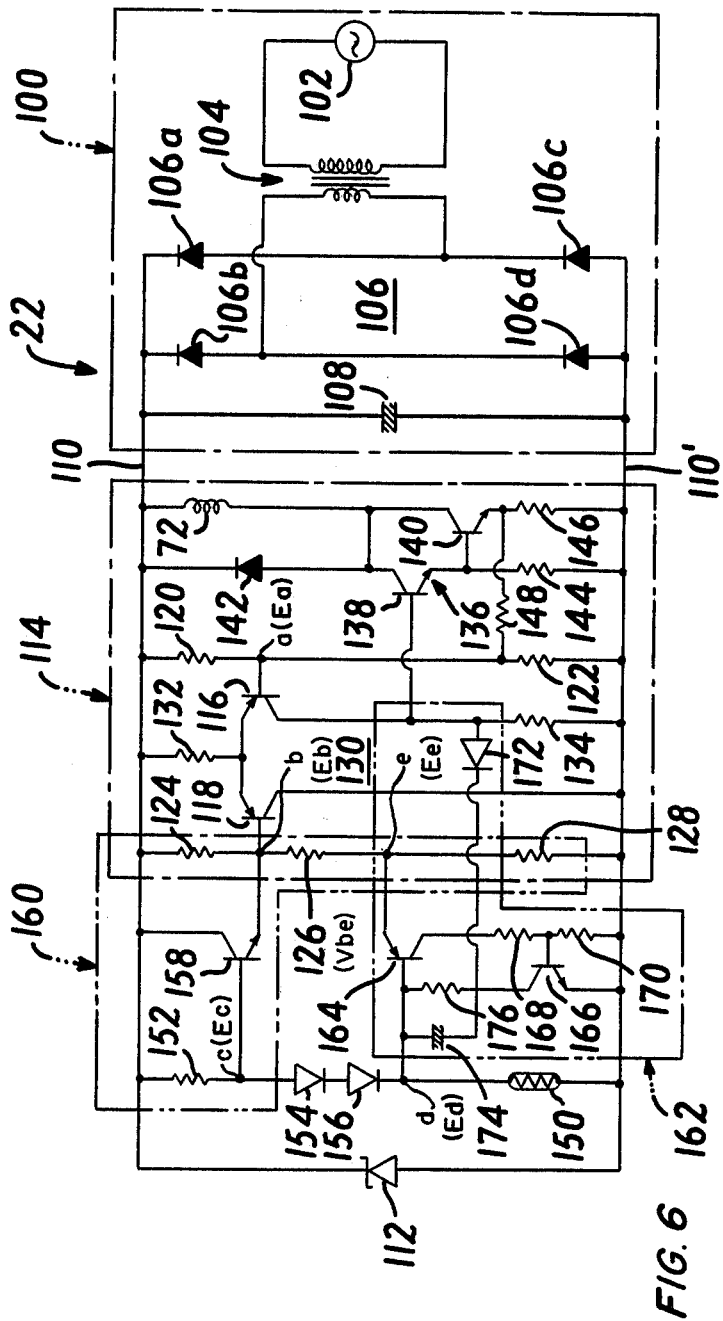
FIG. 6 is a diagram showing a preferred example of an electric circuit for use with the valve unit illustrated in FIG. 5.

FIGS. 5 and 6 illustrate a preferred embodiment of a valve arrangement according to the present invention wherein the control unit 22 is constructed by an electric circuit.

Referring to FIG. 5, the flow control valve unit 16 comprises a valve casing 26 formed with a cavity 28 constituting a valve chamber in an upper portion of the casing, a cavity 30 extending downwardly from the cavity or valve chamber 28, a fluid inlet port 32 in constant communication with the valve chamber 28 and a fluid outlet port 34 in constant communication with the cavity 30. The casing 26 has formed at the upper end of the cavity 30 an annular valve seat portion 36 projecting upwardly into the valve chamber 28 as shown. The casing 26 further has an annular flange portion 38 projecting radially outwardly from the upper end of the casing. The fluid inlet port 32 is in communication with the fuel-gas feed pipe 12 downstream of the flow shutoff valve unit 14 and the fluid outlet port 34 is in communication through the fuel-gas feed pipe 12 with the nozzles in the gas burning unit 10 shown in FIG. 3.

A generally cylindrical hollow casing 40 with a lower bottom end is positioned above the valve casing 26 thus configured. The hollow casing 40 has an annular flange portion 42 projecting radially outwardly from the lower end of the casing 26 and is fixedly mounted on the valve casing 26 through an annular sealing element 44 and apertured partition plates 46 and 48 by suitable fastening means such as bolts or screws 50 connecting the lower flange portion 42 of the hollow casing 40 to the upper flange portion 38 of the valve casing 26 through respective outer peripheral portions of the sealing element 44 and the apertured partition plates 46 and 48. The partition plates 46 and 48 separate the valve chamber 28 in the valve casing 26 from the space in the hollow casing 40 end are formed with central apertures 52 which are located above the annular valve seat portion 36 of the valve casing 26 as shown.

A solenoid-operated valve actuator 54 is positioned withing the hollow casing 40. The valve actuator 54 is supported by a bracket 56 fixed to the casing 40 as at 58 and formed with an opening 60 located above and aligned with the apertures 52 in the above mentioned partition plates 46 and 48. The valve actuator 54 comprises a bobbin 62 consisting of a hollow cylindrical portion 64 and annular flange portions 66 and 68 at the opposite ends of the cylindrical portion. The cylindrical portion 64 is positioned vertivally within the hollow casing 40 with the flange portions 66 and 68 located at the lower and upper ends, respectively, of the bobbin 62 and is formed with an axial bore 70 which is open at the upper and lower ends of the cylindrical portion and which is positioned above and axially aligned with the opening 60 in the bracket 56 and accordingly with the central apertures 52 in the partition plates 46 and 48 and the valve seat portion 38 of the valve casing 26. The bobbin 62 has carried thereon a solenoid coil 72 of a conductor helically wound in layers on the cylindrical portion 64 of the bobbin. The bobbin 62 is fixedly mounted on the previously mentioned bracket 56 with an annular spacer plate 74 closely interposed between the lower flange 66 of the bobbin and the upper face of the bracket 56. The spacer plate 74 is formed with a central opening 76 aligned with the opening 60 in the bracket 56 and accordingly with the axial bore 70 in the bobbin 62. A bracket 78 is fixedly mounted on the upper flange 68 of the bobbin 62 with an annular spacer plate 80 closely interposed therebetween. The bracket 78 and the spacer plate 80 are also formed with openings 82 which are aligned with the axial bore 70 in the bobbin 62. The lower and upper brackets 56 and 78 are formed with projections 56a and 78a extending downwardly and upwardly from the brackets 56 and 78, respectively, as shown. The solenoid coil 72 is electrically connected to the control unit or circuit 22 in such a manner that will be described with reference to FIG. 6.

A ferromagnetic plunger 84 is axially movable through the bore 70 in the bobbin 62. The plunger 84 axially projects downwardly from the lower end of the cylindrical portion 64 of the bobbin 62 and the openings 60 ad 76 in the bracket 56 and spacer plate 74, respectively, toward the cavity 30 in the valve casing 26 and is connected at its lower end to a valve disc 86 by a valve stem 88 extending vertically through the valve chamber 28. The valve disc 86 is preferably formed of an elastic material such as rubber and is axially movable with the plunger 84 between a first postion contacting the valve seat portion 36 of the casing 26 as illustrated and a second position axially spaced apart a maximum distance Dm from the valve seat portion 36. An annular diaphragm element 90 is fixed along its inner circumferential end to the valve stem 88 and along its outer circumferential end to the inner circumferential edges of the apertured partition plates 46 and 48. The apertures 52 in the partition members 46 and 48 are thus isolated from each other by the diaphragm element 90 so that the valve chamber 28 in the casing 26 is hermetically sealed off from the space in the hollow casing 40. The plunger 84 is connected at its upper end opposite to the valve disc 86 to a rod 92 of non-magnetic material. The rod 92 projects axially upwardly from the axial bore 70 in the bobbin 62 and the openings 82 in the bracket 78 and spacer plate 80 toward the top wall portion of the casing 40.

Leaf springs 94 and 94' are fixedly connected each at one end to the previously mentioned projections 56a and 78a of the lower and upper brackets 56 and 78 as at 96 and 96', respectively. The leaf spring 94 is anchored at the other end to a pin 98 secured to that portion of the plunger 84 which constantly projects downwardly from the opening 60 in the lower bracket 56, while the leaf spring 94' is anchored at the other end to a pin 98' secured to that portion of the above mentioned rod 92 which constantly projects upwardly from the opening 82 in the upper bracket 78 as shown. The leaf springs 94 and 94' are preloaded to bins the plunger 84 in a direction to move the valve disc 86 toward the previously mentioned first position contacting the valve seat portion 36 of the valve casing 26. The leaf springs 94 and 94' serve not only as means biasing the plunger 84 in the above mentioned direction but as means for supporting the plunger 84 and the valve disc 86 while allowing the plunger 84 to axially move relative to the bobbin 62. The conductor constituting the solenoid coil 72 is wound on the bobbin 62 in a direction in which the plunger 86 is moved upwardly against the forces of the leaf springs 94 and 94' when the coil 72 is energized.

When, thus, the solenoid coil 72 is de-energized, the plunger 84 is moved axially downwardly by the forces of the leaf springs 94 and 94' and moves the valve disc 86 into the previously mentioned first position thereof contacting the valve seat portion 36 of the valve casing 26 as illustrated. The cavity 30 is isolated from the valve chamber 28 by the valve disc 86 and as a consequence the communication between the fluid inlet and outlet ports 32 and 34 is interrupted. Under these conditions, the fuel gas which has been passed through the flow shut-off valve unit 14 in the water heating device shown in FIG. 3 is shut off by the flow control valve unit 16 so that the gas burning unit 10 is held inoperative in the absence of the fuel gas supplied thereto. The control valve unit 16 is thus held in the previously mentioned zero-flow mode candition Z when the solenoid coil 72 of the valve actuator 54 is de-energized.

When the coil 72 is energized by the control circuit 22, the plunger 84 of the valve actuator 54 is magnetized and the mutual action of the field in the solenoid on the poles created on the plinger 84 causes the plunger to move axially upwardly against the opposing forces of the leaf springs 94 and 94'. The valve disc 86 is now moved upwardly from the valve seat potion 36 of the casing 26, providing communication between the valve chamber 28 and the cavity 30 and accordingly between the fluid inlet and outlet ports 32 and 34 in the casing 26. The fuel gas passed through the flow shut-off valve 14 of the water heating device shown in FIG. 3 is therefore allowed to pass through the flow control valve unit 16 and reaches the gas burning unit 10. The distance through which the valve disc 86 is thus moved from the first position toward the second position thereof and, accordingly, the degree of communication between the valve chamber 28 and the cavity 30 in the valve casing 26 are dictated by the current with which the solinoid coil 72 is energized. The fuel gas is, thus, allowed to pass through the valve unit 16 at a rate which varies substantially proportionately with the current supplied to the solenoid coil 72 from the control circuit 22. If, therefore, the current supplied to the solenoid coil 72 is kept at a certain value, the valve disc 86 will be maintained in a position spaced apart a predetermined sistance Dc smaller than the above mentioned maximum distance Dm from the valve seat portion 36 of the casing 26 and accordingly the flow rate of the fuel gas through the valve unit 16 or, more exactly, between the valve chamber 28 and the cavity 30 in the casing 26 will be kept at a fixed value which is denoted by Fc in the graph of FIG. 4. The valve unit 16 is thus held in the previously mentioned constant-flow mode condition Y when the current supplied to the solenoid coil 72 is maintained at a fixed value. If the current fed to the coil is increased beyond such a fixed value, the plunger 84 and accordingly the valve disc 86 are further moved away from the valve seat portion 36 of the casing 26 with the result that the degree of communication between the valve chamber 28 and the cavity 30 in the casing 26 and accordingly the flow rate of the fuel gas through the valve unit 16 are increased. The movement of the valve disc 86 is ceased by the restraint exercised on the plunger by means of the diaphragm element 90 and the leaf springs 94 and 94' when the plunger 84 reaches an axial position having the valve disc 86 in the previously mentioned second position spaced apart from the valve seat portion 36 of the casing 26 through the maximum distance Dm. When the valve disc 86 is being moved between the positions spaced apart the distance Dc and Dm, the valve unit 16 is maintained in the previously mentioned variable-flow mode condition X allowing the fuel gas to flow therethrough at a rate which varies with the current supplied to the solenoid coil 72. When the valve disc 86 is in the position spaced apart the maximum distance Dm from the valve seat portion 36 of the casing 26, a maximum degree of communication is established between the valve chamber 28 and the cavity 30 in the casing 26 so that the fuel gas is allowed to pass through the valve unit 16 at a maximum rate which is denoted by Fm in the graph of FIG. 4. The valve unit 16 is now in the previously mentioned maximum-flow mode condition W passing the flow of the fuel gas therethrough at the fixed rate Fm without respect to variation in the current flowing in the solenoid coil 72.

FIG. 6 illustrates a preferred example of the control circuit 22 capable of producing a current effective to operate the solenoid-operated valve unit 16 in any of the above described four different modes depending upon the temperature of the hot water detected by the signal generating means 24 (FIG. 3).

Referring to FIG. 6, the control circuit 22 comprises a constant-current power supply circuit 100 which is composed of an alternating-current power source 102, a stepdown transformer 104 having a primary winding connected across the power source 102, a fullwave rectifier circuit 106 connected across the secondary winding of the transformer 104, and a filter capacitor 108. The fullwave rectifier circuit 106 is shown, by way of example, to be constituted by a bridge arrangement of four diodes 106a, 106b, 106c and 106d and is operative to produce a pulsating unidirectional current from the single-phase alternating current supplied from the secondary winding of the stepdown transformer 104. The rectifier circuit bridge 106 is connected between positive and negative bus lines 110 and 110'. The filter capacitor 108 is connected between these bus lines 110 and 110' and smoothes the pulsating current from the rectifier circuit 106. Between the bus lines 110 and 110' is further provided a Zener diode 112 (shown at the leftmost end of the drawing) having its cathode terminal connected to the positive bus line 110 so as to maintain the voltage between the bus lines 110 and 110' substantially constant.

The control circuit 22 further comprises a differential amplifier circuit 114 which includes direct-coupled transistors 116 and 118 of the same type such as the p-n-p type as shoen and having substantially similar performance characteristics. The transistor 116 has its base connected between the positive and negative bus lines 110 and 110' through resistors 120 and 122, while the transistor 118 has its base connected between the bus lines 110 and 110' through resistors 124, 126 and 128. The transistors 116 and 118 thus constitute, in conjunction with a series combination of the resistors 120 and 122 and a series combination of the resistors 124, 126 and 128, a differential amplifier bridge network 130 having the base of one transistor 116 connected to a junction point a between the resistors 120 and 122 and the base of the other transistor 118 connected to a junction point b between the resistors 124 and 126. The emitters of the transistors 116 and 118 are jointly connected to the bus line 110. Designated by 132 is the sum of the emitter resistances of the transistors 116 and 118. The collector of the transistor 116 is connected to the bus line 110' through a resistor 134, while the collector of the transistor 118 is shown directly connected to the negative bus line 110. The bridge network 130 thus constructed by the transistors 116 and 118 and the resistors 120, 122, 124, 126 and 128 is operative to produce between the collector of the transistors 116 and 118 a voltage corresponding to an algebraic difference between the potentials at the junction points a and b. The output current of the bridge network 130 is passed from the collector electrode of the transistor 116 to an amplifier arrangement 136 consisting of taniem-connected transistors 138 and 140 with grounded emitters. The transistor 138 has its base connected to the collector of the above mentioned transistor 116 and its collector connected to the positive bus line 110 through a paralle combination of a diode 142 and the coil 72 of the solenoid-operated valve actuator 54 previously described with reference to FIG. 5. The emitter of the transistor 138 is connected to the negative bus line 110' and to the base of the transistor 140. The transistor 140 has its collector connected to the positive bus line 110 through the above mentioned parallel combination of the diode 142 and the coil 72 and its emitter connected to the negative bus line 110'. Designated by 144 and 146 are the emitter resistances of the transistors 138 and 140, respectively. The diode 142 has its cathode terminal connected to the positive bus line 110 and is thus adapted to absorb a counter-electromotive-force to be induced by the coil 72 when the coil is energized by the current flowing through the transistor 138. The emitter of the transistor 140 is further shown to be connected to the base of the above mentioned transistor 116 through a resistor 148 constituting a negative feedback circuit for stabilizing the current gains in the differential amplifier circuit 114 composed of the bridge network 130 and the amplifier arrangement 136.

The previously mentioned temperature-sensitive signal generating means 24 (FIG. 3) includes a thermistor 150 which is connected in series with a resistor 152 between the positive and negative bus lines 110 and 110'. For the reason to be explained later, diodes 154 and 156 are connected in series between the thermistor 150 and the resistor 152 with their cathode terminals directed toward the thermistor 150.

A transistor 158 has its base connected to a junction point c between the above mentioned resistor 152 and the series combination of the diodes 154 and 156. The collector of the transistor 158 is connected to the positive bus line 110 and the emitter thereof is connected to the previously mentioned junction point b between the resistors 124 and 126. Thus, the transistor 158 makes up, in conjunction with the series combination of the resistors 124, 126 and 128 and the series combination of the thermistor 150 and the resistor 152, a bridge network with the junction points b and c connected together through the base and emitter of the transistor 154. The bridge network constitutes bistable switch means 160 between the previously described differential amplifier circuit 114 and the signal generating means including the thermistor 150.

The control circuit 22 further comprises second bistable switch means 162 which includes transistors 164 and 166. The transistor 164 has its base connected to a junction point d between the thermistor 150 and the series combination of the diodes 154 and 156 and its emitter connected to a junction point e between the above mentioned resistirs 126 and 128. The resistor 126 interveining between the junction points b and e produces a predetermined difference between the potentials at the points b and e. The collector of the transistor 164 is connected through a series combination of voltage dividing resistors 168 and 170 to the negative bus line 110'. On the other hand, the transistor 166 has its base connected to a node between the resistors 168 and 170 and its emitter connected to the negative bus line 110'. The collector of the transistor 166 is connected to the transistor 116 of the differential amplifier circuit 114 through a diode 172 having its cathode directed toward the transistor 166. For the reason to be explained later, a parallel combination of a capacitor 174 and a resistor 176 is connected between the collector of the transistor 168 and base of the transistor 164, viz., the junction point d. The previously mentioned diodes 150 and 152 connected between the junction points c and d are intended to compensate for variation in the performance characteristics of the transistors 158 and 164 due to temperature to which the transistors may be subjected during operation the gas-burning water heating device incorporating the control circuit 22.

The operation of the control circuit 22 constructed and arranged in the above described fashion will be hereinafter described with reference to FIGS. 3 to 6. In the description to follow, the potentials at the points a, b, c, d and e above mentioned are represented by Ea, Eb, Ec, Ed and Ee, respectively, wherein the potential Ea assumes a substantially fixed value related to the voltage between the positive and negative bus lines 110 and 110' while the potentials Ec and Ed assume substantially equal values which are continuously variable with the temperature to which the thermistor 150 is subjected. On the other hand, the potentials Eb and Ee assume substantially fixed values Eb' and Ee' related to the voltage between the bus lines 110 and 110' when the transistor 158 between the junction points b and d is non-conducting. When the transistor 158 becomes conducting, the potentials Eb and Ee vary with the potential Ec. The transistor 158 being arranged as an emitter-follower circuit, the potential Eb is substantially equal to the potential Ec. The fixed values Ea and Eb' of the potentials at the junction points a and b are predetermined by properly selecting the resistance values of the resistors 120, 122, 124, 126 and 128 in such a manner as to produce a predetermined constant current at the output terminal of the bridge network 130, viz., at the collector of the transistor 116 thereof when the control circuit 22 is in the condition producing the constant-flow mode Y in the fuel-gas flow control valve unit 24 (FIG. 3). The resistor 126 in particular is selected to produce a predetermined amount of voltage drop Vbe so that the potential Ee at the junction point e is at all times lower by the value Vbe than the potential Eb at the junction point b. The resistor 154 of the first switch means 160 is selected so that the potential Ec at the junction point c substantially equals the above mentioned fixed value EB' when the resistance of the thermistor 150 is representative of the previously mentioned first critical temperature level Tp between the variable-flow and constant flow modes X and Y in the fuel-gas flow control valve unit 16. On the other hand, the resistor 126 is selected to produce a predetermined amount of voltage drop Vbe therethrough so that the potential Ee at the junction point a is at all times lower by the value Vbe than the potential Eb at the junction point b and that the fixed value Ee' thereof is substantially equal to the potential Ed when the resistance of the thermistor 150 is reduced to a value representative of the previously mentioned second critical temperature level Tq.

When, now, the temperature detected by the thermistor 150 is lower than the first critical level Tp, the resistance of the thermister 150 is greater than a certain value so that the potential Ec at the junction point c is higher than the potential Eb' at the junction point b. The transistor 158 of the first switch means 160 is therefore triggered and made conducting so that the potential Eb at the junction point b becomes substantially equal to the potential Ec. The voltage impressed on the base of the transistor 118 of the differential amplifier bridge network 130 is thus varied substantially in direct proportion to the potential Ec at the junction point c with the result that the bridge network 130 produces between the collectors of the transistors 116 and 118 a voltage which is representative of the difference between the fixed potential Ea and the variable potential Eb. The output of the bridge network 130 is delivered as a current from the collector of the transistor 116 to the amplifier arrangement 136 composed of the tandem-connected transistors 138 and 140 to energize the coil 72 of the solenoid-operated valve actuator 54 (FIG. 5) with the current from the amplifier arrangement 136. The coil 72 is thus energized by the current varying with the temperature detected by the thermistor 150 and, as a consequence, the solenoid-operated valve actuator 54 is operative to continuously control the flow of fuel gas through the gas-flow control valve unit 16 in proportion to the temperature of the hot water being passed through the hot-water discharge pipe 6 (FIG. 3). The valve unit 16 shown in FIG. 5 is thus operated in the variable-flow mode condition X as indicated by the line OP of the plot shown in FIG. 4, unless the temperature detected by the thermistor 150 is reduced below the level Tm. If, however, the temperature of hot water as detected by the thermistor 150 drops below the level Tm, the valve unit 24 is held in a condition providing the maximum-flow mode W establishing a maximum flow of fuel gas therethrough. When the valve unit 16 is being operated in the variable-flow mode condition X or the maximum-flow mode condition W, the potential Ed (which is substantially equal to the potential Ec) at the junction point d is higher than the potential Ee (which is lower by Vbe than the potential Eb) at the junction point e so that the transistor 164 of the second switch means 162 is inversely biased between its base and emitter and is kept non-conducting.

When the temperature of hot water detected by the thermistor 150 is increased beyond the first critical level Tp, the resistance thereof is decreased below a certain value causing the potential Ec at the junction point c to become lower than the value Eb' prescribed for the junction point b. The transistor 158 of the first switch means 160 is therefore biased in reverse direction between its base and emitter and is made non-conducting. The potential Eb at the junction point b is maintained at the fixed level Eb' and, as a consequence, the differential emplifier bridge network 130 produces at the collector of the transistor 116 a constant current corresponding to the algebraic difference between the potentials Ea and Eb at the junction points a and b, respectively. If, under these conditions, the temperature detected by the thermistor 150 is lower than the second critical level Tq, the potential Ed at the junction point d remains higher than the potential Ee' at the junction point e so that the transistor 164 and accordingly the transistor 166 of the second switch means 162 are kept non-conducting. The current occurring at the collector of the transistor 116 of the differential amplifier bridge network 130 is passed to the amplifier arrangement 136 and causes the coil 72 of the solinoid-operated valve actuator 54 (FIG. 5) to be energized with a constant current which is amplified by the amplifier arrangement 136. The fuel-gas flow control valve unit 16 (FIGS. 3 and 5) is thus controlled to operate in the constant-flow mode condition Y passing the fuel gas therethrough at a fixed rate which is indicated by Fc as indicated by the line PQ of the plot shown in FIG. 4. When the temperature detected by the thermistor 150 exceeds the second critical level Tq, the resistance of the thermistor 150 becomes smaller than a certain value and the potential Ed at the junction point d is made lower than the potential Ee' at the junction point e in the second switch means 162 so that the transistor 164 is made conducting. The transistor 166 is now triggered and provides a conducting path between the diode 172 and the negative bus line 110' therethrough so that the current occurring at the collector of the transistor 116 of the differential amplifier bridge network 130 is bypassed to the negative bus line 110' in shunt across the amplifier arrangement 136 and the solenoid coil 72. As a consequence, the coil 72 of the valve actuator 54 is de-energized and establishes in the fuel-gas flow control valve unit 16 the zero-flow mode condition Z interrupting the flow of fuel gas therethrough as indicated by the line QQ' of the plot shown in FIG. 4. The temperature of the hot water being passed through the hot-water discharge pipe 6 is therefore gradually reduced in the absence of heat produced by the gas burning unit 10 (FIG. 3).

When the transistor 166 of the second switch means 162 is conducting as above described, the transistor 166 establishes a conductive path not only between the diode 172 and the negative bus line 110' but between the bus line 110' and the base of the transistor 164, viz., the junction point d through the resistor 176. The potential Ed at the junction point d is, therefore, partially discharged to the negative bus line 110' and, as a consequence, the transistor 164 is biased in forward direction by a value corresponding to a predetermined amount of voltage drop ΔE which is dicated by the resistance value of the resistor 176. When, therefore, the temperature detected by the thermistor 150 is reduced below the second critical level Tq, the potential Ed at the junction point d remains lower than the potential Ee and, for this reason, the fuel-gas flow control valve unit 16 is maintained in the zero-flow mode condition Z as indicated by the line QR of the plot shown in FIG. 4. If the temperature detected by the thermistor 150 thus reaches the previously mentioned third critical level Tr between the first and second critical levels Tp and Tq and consequently the potential Ed at the junction point d becomes lower than the potential Ee' at the junction point e, the transistor 164 is biased in the reverse direction and is made non-conducting, interrupting the conducting path between the diode 172 and the netative bus line 110'. The constant current occurring at the output terminal of the differrential aplifier bridge network 130 is, for a second time, fed upon amplification by the transistors 138 and 140 to the coil 72 of the solenoid-operated valve actuator 54, causing the fuel-gas flow control valve unit 16 to be shifted back from the zero-flow mode condition Z to the constant-flow constant-flow mode condition Y, as indicated by the line RR' of the plot shown in FIG. 4. The difference between the second and third critical temperature levels Tq and Tr can be predetermined by properly selecting the above mentioned voltage drop ΔE, viz., the resistance value of the resistor 176.

When the transistors 164 and 166 are in conduction state as above described, the capacitor 174 connected to the collector of the transistor 166 in parallel with the resistor 176 is charged by the current flowing through the resistor 176. When the transistors 164 and 166 are then made non-conducting, the capacitor 174 discharges the stored charges and temporarily raises the potential Ec at the junction point c through the junction point d. The current supplied to the coil 72 is, therefore, instantaneously increased to such a level as will initiate the valve unit 24 into the maximum-flow mode condition W as indicated by the line R'R" of the plot shown in FIG. 3. The valve unit 16 passes the fuel gas at the maximum rate Fm therethrough so that the fuel gas discharged from the main nozzles of the gas burning unit 10 is fired with certainty by the flame from the pilot nozzle 20. The period of time for which the valve unit 16 is caused to temporarily stay in the fully open condition can be determined by selecting the capacitance of the capacitor 174. The combination of the capacitor 174 and resistor 176 is thus conducive to assuring the firing of the fuel gas discharged from the gas burning unit 18 at a time point when the valve unit 16 is shifted back from the zero-flow mode condition Z into the constant-flow mode condition Y. As will be understood from the previous description, the resistor 176 in particular is further conducive to stabilizing the switching action of the transistor 164 because the transistor 164 in the condition state is forwardly biased and can be maintained conducting even when the temperature applied to the thermistor 150 happens to temporarily rise for some reason.

Figure 1:
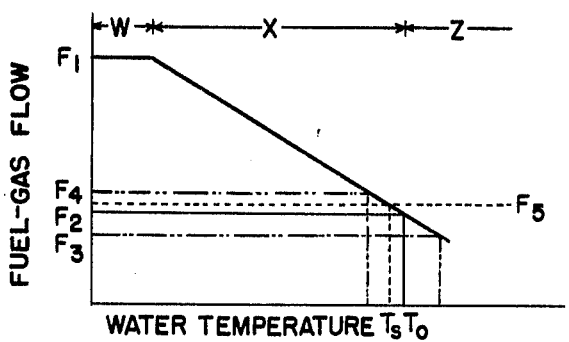
FIG. 1 is a graphic representation of the performance characteristics of a prior art fuel-gas flow control valve incorporated into a gas-burning water heating device.
Figure 2:
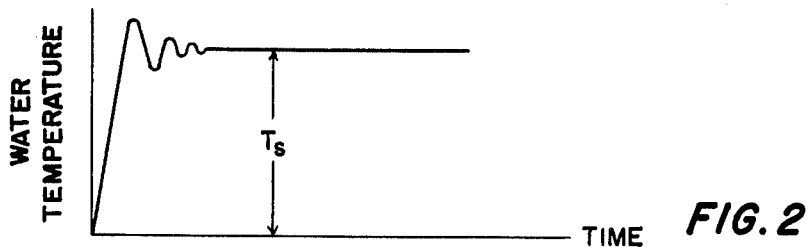
FIG. 2 is a graph indicating the fluctuations in the flow rate of fuel gas through a valve of the type having the performance characteristics of FIG. 3 as caused at an incipient stage after the delivery of the fuel gas through the valve is re-opened.
Figure 4:
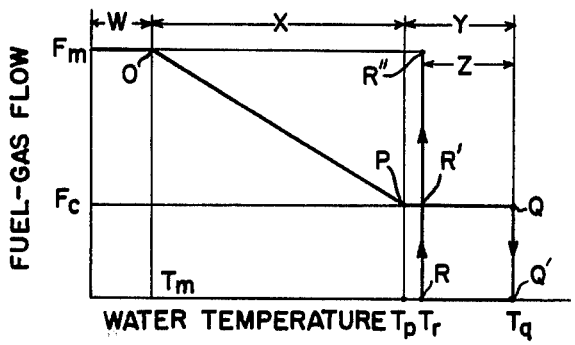
FIG. 4 is a graphic representation of the performance characteristics of the valve arrangement shown in FIG. 3.

When the supply of the fuel gas is thus re-opened as indicated at the point R' in the plot of FIG. 4, the temperature of the hot water passed through the heat exchanger 4 (FIG. 3) will increase if the flow rate of hot water through the cock 8 is reduced or kept unchanged. The solenoid coil 72 of the valve actuator 54 (FIG. 5) is therefore kept energized by the constant current until the water temperature detected by the thermistor 150 reaches the second critical level Tq at the point Q in FIG. 4. When the water temperature reaches the level Tq, the coil 72 is de-energized for a second time and causes the valve unit 16 to be shifted into the zero-flow mode condition Z. The control valve unit 16 is thus alternately shifted between the constant-flow mode condition Y and the zero-flow mode condition Z when the hot water temperature detected by the thermistor 150 is maintained higher than the first critical level Tp and if the flow rate of water through the heat exchanger 4 (FIG. 3) is reduced or kept unchanged. In other words, the solinoid coil 72 of the valve actuator 54 is repeatedly energized and de-energized and the temperature of the water passed through the discharge pipe 4 is altered between the second and third critical levels Tp and Tr when the hot water temperature is higher than the first critical level Tp and unless the flow rate of water through the heat exchange 4 is increased.

Figure 7:
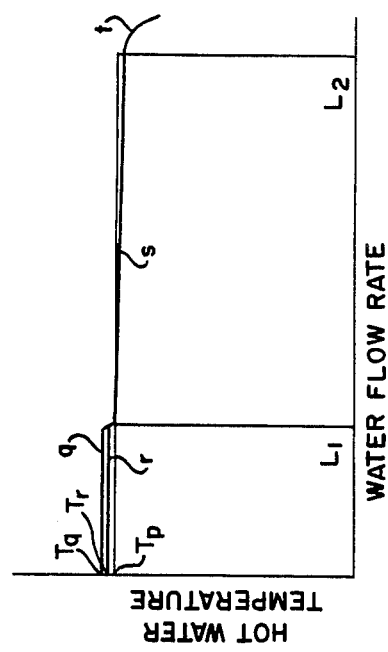
FIG. 7 is a graph indicating the relationship between the flow rate and the temperature of hot water delivered from the water heating device illustrated in FIG. 3.

FIG. 7 illustrates an example of the relationship between the flow rate and the temperature of the water passed through the hot-water discharge pipe 6 of the device shown in FIG. 3 as achieved when the flow control valve 16 is operated in accordance with the schedules hereinbefore described by the control circuit 22 shown in FIG. 6. In FIG. 7, $L_1$ designates an upper limit of the flow rate of water which can be heated to a temperature higher than the first critical level Tp when the water is passed through the heat exchanger 4. When the flow rate of water passed through the heat exchanger 4 is less than the limit $L_1$, the flow rate of the fuel gas required to be passed through the valve unit 16 for heating the water to the temperature level Tp is less than the minimum value Fc and, as a consequence, the valve unit 16 is operated with the performance characteristics following the closed loop Q-Q-'-R-R'-Q (disregarding the temporary rise of the fuel-gas flow rate following the line R'R") of the plot shown in FIG. 4. The valve unit 16 is thus alternately shifted between the constant-flow and zero-flow mode conditions Y and Z with the solenoid coil 72 of the valve actuator 54 repeatedly energized and de-energized in a manner above described with reference to FIG. 6. The temperature of the water passed through the heat exchanger 4 is therefore varied between the second and third critical levels Tq and Tr as indicated by curves q and r in the graph of FIG. 7. When, however, the flow rate of water passed through the heat exchanger 4 is increased beyond the limit $L_1$, the water passed through the heat exchanger 4 can not be heated to a temperature higher than the first critical level Tp if the valve unit 16 is maintained in the constant-flow mode condition Y passing the fuel gas therethrough at the fixed rate Fc. The temperature of the water heated by the heat exchanger 4 is thus reduced below the second critical level Tr as indicated by line R'P of the plot shown in FIG. 4.

When the temperature detected by the thermistor 150 is thus reduced below the level Tr and further below the first critical level Tp, the potential Ec at the junction point c becomes higher than the fixed potential Eb' at the junction point b in the control circuit 22 of FIG. 6 and makes the transistor 158 of the first switch means 160 conducting. The coil 72 of a valve actuator 54 (FIG. 5) is therefore energized with the current increasing as the temperature of the not water passed through the discharge pipe 6 is reduced, causing the valve unit 16 to operate in the variable-flow mode condition X. The flow rate of the fuel gas through the valve unit 16 is thus controlled to vary with the flow rate of water through the heat exchanger 4 so that the temperature of the water heated by the heat exchanger 4 is maintained at a substantially fixed level approximating the first critical level Tp as indicated by curve s in the graph of FIG. 7. When the flow rate of water through the heat exchanger 4 reaches a certain level $L_2$, the water can not be heated up to the temperature level Tp so that the temperature of water as detected by the thermistor 150 commences to drop below the level Tp. The temperature of water passed through the heat exchanger 4 is gradually reduced below the critical level Tp as the flow rate of water through the heat exchanger is increased beyond the level $L_2$ as indicated by curve t in the graph of FIG. 7. When the temperature of the water passed through the heat exchanger 4 at a rate higher than the level $L_2$ is reduced below the previously mentioned level Tm (FIG. 4), the valve unit 16 is maintained in the maximum-flow mode condition W passing the fuel gas at the maximum rate Fm but the temperature of water passed through the heat exchanger 4 drops abruptly.

In the valve arrangement hereinbefore described with reference to FIGS. 3 to 6, the shifting of the valve unit 16 between the variable-flow mode condition X and the constant-flow mode condition Y is effected by the action of the first bistable switch means 160 and the shifting of the valve unit 16 between the constant-flow mode condition Y and the zero-flow mode condition Z is effected by the action of the second bistable switch means 162 of the control vircuit 22 shown in FIG. 6. The shifting of the valve unit 16 from the zero-flow mode condition Z back into the constant-flow mode condition Y as indicated by the line RR' is, in particular, effected by means of the resistance-capacitance circuit consisting of the capacitor 174 and the resistor 176 incorporated into the second switch means 162.

Figure 8:
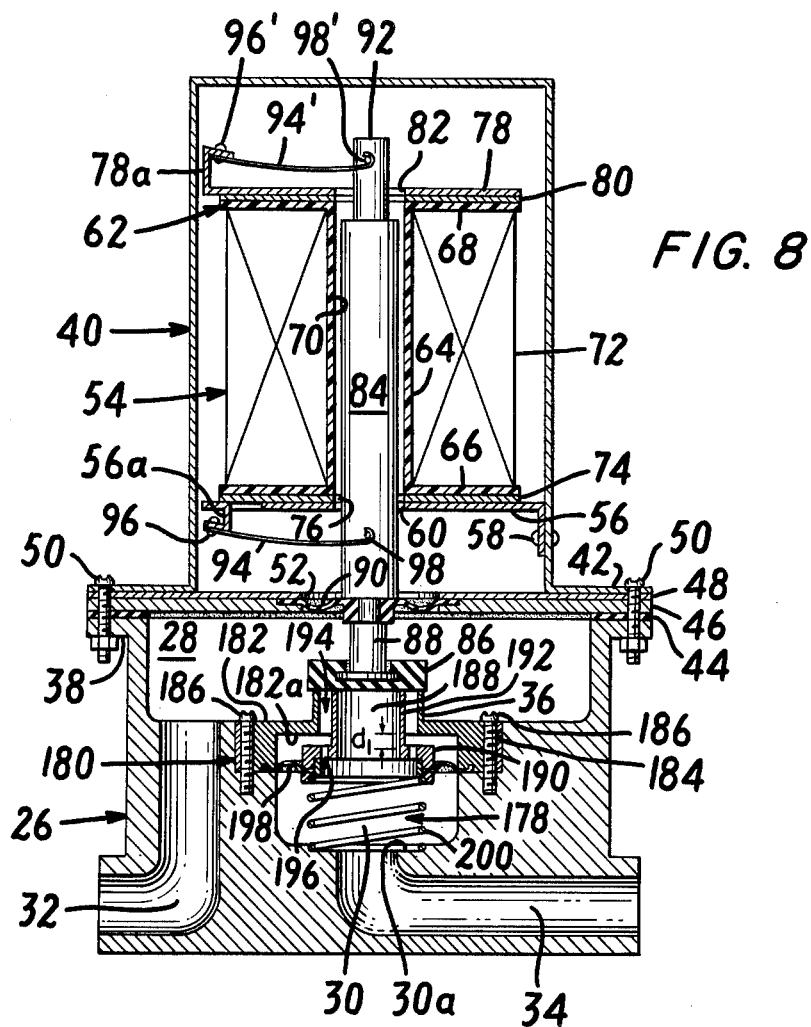
FIG. 8 is a vertical sectional view showing a modification of the valve unit depicted in FIG. 5.

FIG. 8 illustrates a modification of the valve unit shown in FIG. 5. The valve unit illustrated in FIG. 8 is also assumed to be incorporated into the gas-burning water heating device of the nature shown in FIG. 3. The control unit for the valve unit of FIG. 8 is also constructed by an electric circuit operating on the basis of the signal from the signal generating means 24 which may include a thermistor. While the valve unit 16 shown in FIG. 5 depends for its operation upon the action of the control circuit shown in FIG. 6 when shifted between the variable-flow and constant-flow mode conditions X and Y, the valve unit shown in FIG. 8 is adapted to be shifted between these conditions in a mechanical fashion.

To achieve such an end, the valve unit illustrated in FIG. 8 comprises, in addition to the members and units constituting the valve unit of FIG. 5, movable valve seat means 178 disposed within the cavity 30 in the valve casing 26. The valve casing 26 has formed internally therein an annular surface portion 30a at the bottom of the cavity 30 in the casing. The previously described valve seat portion 36 is shown to be formed as part of a cap member 180 consisting of an annular flange portion 182 and a tubular portion projecting upwardly from the flange portion 182 and constituting the valve seat portion 36. The valve casing 26 has formed in its wall portion surrounding an upper portion of the cavity 30 a circumferential groove 184 in which the flange portion 182 of the cap member 180 is closely received in such a manner as to have the valve seat portion 36 projecting upwardly into the valve chamber 28 and axially aligned with the valve disc 86 connected to the plunger 84 through the valve stem 88. The cap member 180 is secured to the valve casing 26 by suitable fastening means such as bolts or screws 186 as shown. The flange portion 182 of the cap member 180 has an annular inner or lower surface portion 182a at the upper end of the cavity 30.

The above mentioned movable valve seat means 178 comprises a valve seat member 188 which consists of an annular flange portion 190 movable upwardly and downwardly within the cavity 30 and a tubular portion 192 projecting upwardly from the flange portion 190 and axially movable through the cylindrical space in the tubular valve seat portion 36 of the cap member 180. The tubular portion 192 of the movable valve seat member 188 has an outside diameter smaller than the inside diameter of the tubular valve seat portion 36 of the cap member 180 and is coaxially positioned relative to the valve seat portion 36 so that an annular space or passageway 194 is formed concentrically between the tubular portions 36 and 192. The valve seat member 188 is axially movable upwardly and downwardly relative to the cap member 180 so that the flange portion 190 of the seat member 188 is brought into contact with the previously mentioned annular lower surface portion 182a of the cap member 180 when the valve seat member 188 is moved upwardly. When the valve seat member 188 is in the uppermost position thus having the flange portion 190 in contact with the annular lower surface portion 182a, the tubular portion 192 of the valve seat member 188 projects upwardly into the valve chamber 28 through a predetermined distance $d_1$. In other words, the upper face of the flange portion 190 of the valve seat member 188 is downwardly spaced apart the distance $d_1$ from the annular lower surface portion 182a of the cap mamber 180 when the valve seat member 188 is in a relative position having the upper end of its flange portion 190 located to be flush with the upper end of the valve seat portion 36 of the cap member 180 as shown. The particular position of the valve seat member 188 is the lowermost position thereof as will be understood as the description proceeds. The flange portion 190 of the valve seat member 188 is formed with a suitable number of orifices 196 which are located below the annular passageway 194 between the tubular portions 36 and 192 of the cap and valve seat members 180 and 188, respectively. The number and the sizes of the orifices 196 are selected to provide therethrough a predetermined fluid flow rate which corresponds to the previously mentioned fixed fuel-gas flow rate Fc (FIG. 4). An annular diaphragm element 198 is secured along its outer circumferential end to the flange portion 182 of the cap member 180 and along its inner circumferential end to the flange portion 190 of the movable valve seat member 188. The diaphragm element 198 serves to support the valve seat member 188 to move while allowing the member 188 relative to the casing 25 and the cap member 180 and to divide the cavity 30 into upper and lower compartments which are sealed off from each other by the diaphragm element 198 but which are in communication with each other through the above mentioned orifices 196. The movable valve seat member 188 is biased upwardly by suitable biasing means such as a preloaded helical compression spring 200 which is seated at one end on the annular surface portion 30a of the casing 26 and at the other end on the flange portion 190 of the valve seat member 188 as shown.

Figure 9A:
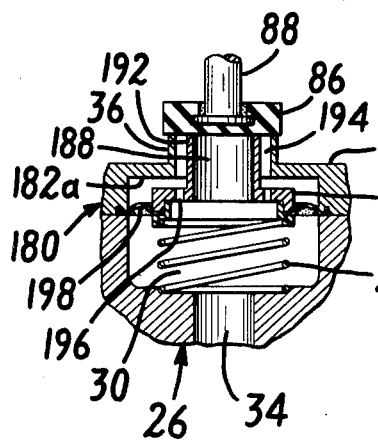
FIGS. 9A, 9B and 9C are fragmentary vertical sectional views showing portions of the valve unit of FIG. 8 in different operational conditions.
Figure 9B:
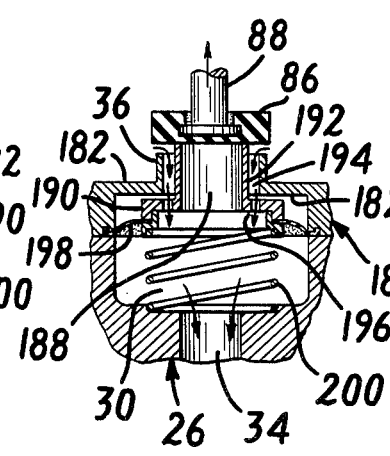
Figure 9C:
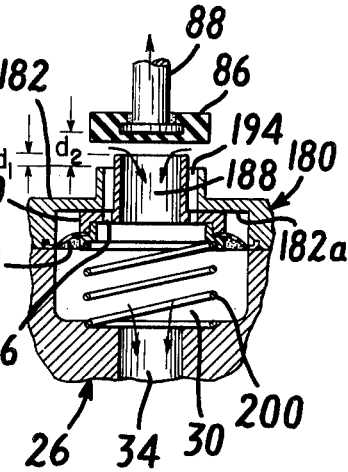

FIGS. 9A, 9B and 9C illustrate the valve disc 86 and the associated parts and members of the above described valve unit in different modes of operation.

When the coil 72 of the solenoid-operated valve actuator 54 (FIG. 8) is de-energized, the plunger 84 of the actuator 54 is moved downwardly by the biasing forces of the leaf springs 94 and 94'. The valve disc 86 is forced against the stationary valve seat portion 36 of the cap member 180 and the upper end of the tubular portion 192 of the movable valve seat member 188 against the opposing force of the preloaded helical compression spring 200 acting on the valve seat member 188. The upper end of the axial bore in the tubular portion 192 of the movable valve seat member 188 and the upper end of the annular passageway 194 between the respective tubular portions 36 and 192 of the cap and valve seat members 180 and 188 are closed by the valve disc 86. The cavity 30 in the valve casing 26 is hermetically isolated from the valve chamber 28 by the valve disc 86 as illustrated in FIG. 9A with the result that the valve unit passes no fluid therethrough. The valve unit is thus maintained in the previously mentioned zero-flow mode condition Z (FIG. 4).

When the coil 72 of the solenoid-operated valve actuator 54 is energized with a current which is continuously increased with time, the plunger 84 of the actuator 54 is moved upwardly against the opposing forces of the leaf springs 94 and 94' through a distance substantially proportional to the current supplied to the solenoid coil 72. The valve disc 86 is therefore unseated from the stationary valve seat portion 36 of the cap member 180 and provides communication between the valve chamber 28 and the lower compartment of the cavity 30 in the casing 26 through the above mentioned annular passageway 194 and through the orifices 196 in the flange portion 190 of the movable valve seat member 188. During an incipient stage after the valve disc 86 has been unseated from the stationary valve seat portion 36 or, in other words, when the valve disc 86 is being moved upwardly from the valve seat portion 36 through a distance which is smaller than the previously mentioned predetermined value $d_1$ (FIGS. 8 and 9C), the movable valve seat member 188 is moved upwardly together with the valve disc 86 by the biasing force of the compression spring 200 and has its upper end kept closed by the valve disc 86, as shown in FIG. 9B. The communication between the valve chamber 28 and the lower compartment of the cavity 30 in the casing 26 is, therefore, provided solely through the annular passageway 194 and the orifices 196 and the fluid (which is assumed to be the fuel gas passed through the flow shut-off valve 14 of the gas-burning water heating device shown in FIG. 4) is allowed to pass from the fluid inlet port 32 to the fluid outlet port 34 (FIG. 8) at a fixed rate dictated by the orifices 196, viz., corresponding to the previously mentioned rate Fc. The valve unit is therefore held in the previously mentioned constant-flow mode condition Y irrespective of the axial position of the valve disc 86 relative to the stationary valve seat portion 36 as long as the valve disc 86 is spaced from the valve seat portion 36 through a distance smaller than the predetermined value $d_1$. The distance $d_1$ is, thus, in correspondence with the previously mentioned distance Dc in the valve unit shown in FIG. 5. The orifices 196 are calibrated so that the flow rate Fc of fluid therethrough is sufficiently smaller than the flow rate of fluid allowed to pass from the valve chamber 28 into the annular passageway 194 through the space between the valve seat portion 36 and the valve disc 86 even when the valve disc 86 is only slightly spaced apart from the valve seat portion 36. The flow rate of the fluid passed through the valve unit in the constant-flow mode condition Y is, for this reason, virtually not affected by the spacing between the valve disc 86 and the stationary valve seat portion 36 of the cap member 180.

When the plunger 84 is further moved upwardly and accordingly the valve disc 86 reaches an axial position spaced apart the above mentioned distance $d_1$ from the stationary valve seat portion 36, the movable valve seat member 188 which has been moved upwardly together with the valve disc 86 by the biasing force of the compression spring 200 has its flange portion 190 brought into contact with the annular lower surface portion 182a of the flange portion 182 of the cap member 180 and is brought to a stop, the surface portion 182a thus serving as stop means for the movable valve seat member 188. As the plunger 84 is further moved upwardly, the valve disc 86 is spaced apart from the stationary valve seat portion 36 of the cap member 180 through a distance greater than the predetermined value $d_1$ and is consequently unseated from the upper end of the tubular portion 192 of the movable valve seat member 188, as illustrated in FIG. 9C. Communication is now provided between the valve chamber 28 and the lower compartment of the cavity 30 in the casing 26 not only through the annular passageway 194 and the orifices 196 but through the bore in the tubular portion 192 of the movable valve seat member 188. The fluid in the valve chamber 28 is therefore passed into the cavity 30 in the casing 26 partly through the annlar passageway 194 and the orifices 196 and partly but in a major proportion through the bore in the movable valve seat member 188 at a rate which is higher than the fixed rate corresponding to the previously mentioned rate Fc and which continuously increases as the valve disc 86 is spaced remoter apart from the upper end of the movable valve seat member 188. In this instance, the valve unit is in the previously mentioned variable mode condition X passing the fluid therethrough at a rate varying substantially proportionately with the current with which the coil 72 of the solenoid-operated valve actuator 54 is energized. When the plunger 84 then reaches its uppermost position, the valve disc 86 assumes an axial position spaced apart a predetermined distance $d_2$ (FIG. 9C) from the stationary valve seat portion 36 of the cap member 180. The fluid in the valve chamber 28 is allowed into the lower compartment of the cavity 30 in the casing 26 at a maximum rate which corresponds to the previously mentioned maximum fuel-gas flow rate Fm (FIG. 4). The valve unit is now in the maximum-flow mode condition W. The distatce $d_1$ above mentioned is, thus, in correspondence with the distance Dm which is in the valve unit of FIG. 5.

From the foregoing description it will be understood that the valve unit shown in FIG. 8 depends for its operation upon the positional relationship, viz., engagement or disengagement between the valve disc 86 and the movable valve seat member 188, not upon the current supplied to the solenoid coil 72 when the valve unit is to be shifted between the constant-flow mode condition Y shown in FIG. 9B and the variable-flow mode condition X shown in FIG. 9C. The control circuit for use with such a valve unit may therefore be so arranged as to supply the solenoid coil 72 with a current that varies proportionately with the temperature of the water passed through the heat exchanger 4 of the device shown in FIG. 3 throughout all the modes of operation of the valve unit. For this reason, the control circuit for the valve unit of FIG. 8 may be composed of the constant-current power supply circuit 100, the differential amplifier circuit 110 and the second bistable switch means 162 alone of the control circuit 22 shown in FIG. 8. Since, in this instance, the first bistable switch means 160 is removed from the control circuit 22, the junction point b in the differential amplifier circuit 110 is connected either directly or through the temperature compensating diodes 154 and 156 to the junction point d between the thermistor 154 and the second switch means 162.

The cap member 180 formed with the stationary valve seat portion 36 has been described as being constructed separately of the valve casing 26 in the valve unit of FIG. 8 but, if desired, the same may be formed as an integral part of the casing 26.

FIG. 10 illustrates another preferred example of the movable valve seat means, wherein the compression spring 200 used in the valve seat means 178 of the valve unit shown in FIG. 8 is replaced with a spring element 202 having the configuration shown in FIG. 11. Referring to FIG. 11, the spring element 202 comprises concentric inner and outer annular portions 204 and 206 radially spaced apart from each other. The inner and outer annular portions 204 and 206 are connected together by a suitable number of radial portions 208 which are arcuately curved or protruded in one axial direction of the spring element 202 and which are preferably equidistantly spaced apart from each other about the center axis of the annular portions 204 and 206. A cylindrical boss portion 210 projecting from the inner circumferential end of the inner annular portion 204 in the axial direction of the spring element 202 opposite to the direction in which the radial portions are curved or protruded, the boss portion 210 being open at both axial ends. The outer annular portion 206 is formed with a suitable number of projections 212 projecting from the outer circumferential end of the portion 206 in the same direction as the cylindrical boss portion 210 projects. The spring element 202 thus configured is formed of spring steel producing a biasing force in the axial direction of the element. The spring element 202 is assumed, by way of example, to be constructed as a unitary member but, if desired, the individual portions or some of the portions of the element 202 may be constructed of separate members which are fixedly connected together by suitable fastening means or by welding.

Turning back to FIG. 10, the spring element 202 having the configuration above described is fixedly connected to the cap member 180 with the above mentioned projections 212 closely interposed between the valve casing 26 and the flange portion 182 of the cap member 180 as shown. The inner and outer annular portions 204 and 206 and the radial portions 208 are positioned below the diaphragm element 198 with the radial portions 208 arcuately curved or protruded downwardly, viz., away from the lower face of the diaphragm element 198. On the other hand, the cylindrical boss portion 210 projecting from the inner annular portion 204 is closely received on a lower end portion of the inner peripheral surface of the tubular portion 192 of the movable valve seat member 188 so that the bore in the tubular portion 192 is in constant communication with the lower compartment of the cavity 30 in the valve casing 26 through the opening in the boss portion 210. While the movable valve seat member of the valve unit shown in FIG. 8 is formed with the orifices 196 in the flange portion 190 thereof, the valve seat member 188 shown in FIG. 10 has orifices 196' formed in the tubular portion 192 thereof for providing constant communication between the annular passageway 194 and the bore in the tubular portion 192.

The spring element 202 thus arranged is constantly operative to upwardly bias the movable valve seat member 188 until the flange portion 190 of the valve seat member 188 is brought into contact with the annular lower surface portion 182a of the flange portion 182 of the cap member 180 fixed to the valve casing 26, providing a function essentially similar to that of the compression spring 200 used in the movable valve seat means 178 of the valve unit shown in FIG. 8. Because, however, the spring element 202 can be mounted between the valve casing 26 and the cap member 180 as a part of an assembly including the movalbe valve seat member 188 and the diaphragm element 198 and because the valve casing 26 need not be formed with a valve seat portion at the lower end of the cavity 30 therein, the number of steps can be significantly reduced as compared with the valve seat means 178 of FIG. 8 when in assembling the valve seat means into the valve casing 26.

FIG. 12 illustrates another modification of the movable valve seat means incorporated in the valve unit shown in FIG. 8. In the arrangement shown in FIG. 13, the movable valve seat means comprises, in addition to the movable valve seat member 188 having the orifices 196 in the flange portion 190, a generally cylindrical inner casing 214 having an open upper end and a lower end wall portion formed with a central opening 216. The inner casing 214 is fixedly positioned within the cavity 30 in the valve casing 26 with its upper end secured to the cap member 180 and with the opening 216 located below and in alignment with the axial bore in the tubular portion 192 of the movable valve seat member 188. The upper end of the inner casing 214 encircles the annular lower surface portion 182a of the flange portion 192 of the movable valve seat member 188. Furthermore, the inner casing 214 has formed in its peripheral wall portion projecting into the cavity 30 a suitable number of orifices 218 through which constant communication is established between the open space in the inner casing 214 and the cavity 30 in the valve casing 26. A generally tubular member 220 having open upper and lower ends is positioned within the space in the inner casing 214 and is secured at the upper end to the lower face of the flange portion 190 of the movable valve seat member 188 and at the lower end to the upper face of the above mentioned lower end wall portion of the inner casing 214 by means of an annular retainer element 224 in such a manner as to provide therethrough a passageway 222 between the axial bore in the tubular portion 192 of the valve seat member 188 and a lower portion of the cavity 30 in the valve casing 26. The tubular member 220 is formed of a resilient material such as rubber and is therefore deformable as the valve seat member 188 is vertically moved toward and away from the lower end wall portion of the inner casing 214. If desired, the tubular member 220 may have its longitudinally intermediate portion slightly bulged radially outwardly as at 220a so that the tubular member 220 is effective to bias the movable valve seat member 188 upwardly in cooperation with the compression spring 200 which is herein shown to be seated at the upper end on the lower face of the flange portion 190 of the valve seat member 188 and at the lower end on the upper face of the lower end wall portion of the inner casing 214. Designated by reference numeral 226 is an annular seal member interposed between the casing 26 and the flange portion 190 of the cap member 180.

When, in operation, the valve unit is in the zero-flow mode condition Z with the valve disc 86 held in contact with the upper end of the stationary valve seat portion 36 of the cap member 180, the annular passageway 194 between the respective tubular portions 32 and 192 of the cap and valve seat members 180 and 188 is closed by the valve disc 86 and, at the same time, the valve seat member 188 is held in a lowermost position having the tubular portion 192 in contact with the valve disc 86 at its upper end and the flange portion 190 downwardly spaced apart a maximum distance from the lower surface portion 182a of the valve seat member 188, similarly to the arrangement of FIG. 8. Under these conditions, the tubular member 220 within the space in the inner casing 214 is caused to axially contract and radially bulge throughout its axial length between the valve seat member 188 and the lower end wall portion of the inner casing 214. When the valve disc 86 is unseated from the stationary valve seat portion 36 of the cap member 180, the movable valve seat member 188 is upwardly moved together with the valve disc 86 by reason of the biasing forces acting jointly thereon from the compression spring 200 and the resilient tubular member 220. The tubular portion 192 of the valve seat member 188 thus remains closed at its upper end by the valve disc 86 but communication is provided between the valve chamber 28 and the annular passageway 194 through the space formed between the valve disc 86 and the open upper end of the stationary valve seat portion 36. The fluid in the valve chamber 28 is therefore passed into the space in the inner casing 214 through the annular passageway 194 and the orifices 196 in the flange portion 192 of the valve seat member 188 and from the space in the inner casing 214 into the fluid outlet port 34 through the orifices 218 in the inner casing 214 and the lower portion of the cavity 30 in the valve casing 26. The flow rate of fluid through the orifices 218 in the inner casing 214 is predetermined to be lower than the flow rate of fluid through the orifices 196 in the valve seat member 188 and, for this reason, the fluid in the valve chamber 28 is passed to the fluid outlet port 34 at a constant rate dictated by the orifices 218 in the inner casing 214 and establishes the constant-flow mode condition in the valve unit. If, in the arrangement shown in FIG. 12, the flow rate of fluid through the orifices 196 in the valve seat member 188 is predetermined to be smaller than the flow rate of fluid through the orifices 218 in the inner casing 214 or if the inner casing 214 is formed with an opening or openings so sized as to permit the fluid to flow from the space in the inner casing 214 into the cavity 30 at a practically unrestricted rate, a pressure difference may be created across the flange portion 192 of the valve seat member 188 due to the restriction provided by the orifices 196. If this occurs, the valve seat member 188 with the flange portion 192 thus acted upon by the pressure difference will be urged downwardly and will fail to faithfully follow the movement of the valve disc 86. The valve seat member 188 may then be allowed to depart from the valve disc 86 before the valve disc reaches a position spaced apart a predetermined distance from the stationary valve seat portion 36 at the end of the constant-flow mode condition of the valve unit. Such a problem is precluded in the arrangement of FIG. 12 in which the fluid pressure in the space in the inner casing 214 is maintained substantially equal to the fluid pressure acting on the upper face of the flange portion 192 of the valve seat member 188 because the flow rate of fluid through the orifices 196 in the valve seat member 188 is sufficiently higher than the flow rate of fluid through the orifices or restrictions 218 in the inner casing 214.

When the valve disc 86 is upwardly moved into the position spaced apart the above mentioned predetermined distance from the stationary valve seat portion 36 of the cap member 180, the flange portion 192 of the valve seat member 188 is brought into contact with the lower surface portion 182a of the cap member 180 as shown and is caused to stop. If the valve disc 86 is further moved upwardly from the particular position, the tubular portion 192 of the valve seat member 180 is allowed to open at its upper and and provides communication between the valve chamber 28 and the axial bore in the tubular portion 192 through the space between the valve disc 86 and the upper end of the tubular portion 192, establishing the variable-flow mode condition in the valve unit. The fluid in the valve chamber 28 is now passed to the fluid outlet port 34 through the axial bore in the valve seat member 188, the axial bore 222 in the resilient tubular member 220, the opening 216 in the lower wall portion of the inner casing 214 and the lower portion of the cavity 30 in the valve casing 30 at a rate which varies proportionately with the space formed between the valve disc 86 and the upper end of the tubular portion 192 of the valve seat member 188.

FIG. 13 illustrates still another modification of the movable valve seat means incorporated in the valve unit of FIG. 8. The movable valve seat means comprises a resilient valve seat member 228 having an annular flange portion 230 and a tubular portion 232 projecting upwardly from the inner circumferential end of the flange portion 230 and having open upper and lower ends. The valve seat member 228 is mounted on the valve casing 26 with the flange portion 230 fixedly interposed between the cap member 180 and a surface portion of the valve casing 26 surrounding the upper end of the cavity 30 in the casing 26 so that the tubular portion 232 projects upwardly through the axial bore in the stationary valve seat portion 36 of the cap member 180. The axial length of the tubular portion 232 is such that the tubular portion projects upwardly from the upper end of the stationary valve seat portion 36 with a predetermined length when the valve seat member is held in an unloaded condition. Between the outer peripheral surface of the tubular portion 232 and the inner peripheral surface of the stationary valve seat portion 36 is formed an annular passageway 234 which is open at the upper end of the stationary valve seat portion 36 and closed at the lower end thereof by flange portion 230. The movable valve seat member 228 has fromed in its tubular portion 232 a suitable number of pores or orifices 235 providing constant communication between the above mentioned annular passageway 234 and the axial bore in the tubular portion 232.

The movable valve seat member 228 is formed of a resilient material such as rubber so that the tubualr portion 232 thereof is axially contractable when pressed downwardly.

When, thus, the valve disc 86 is forced into the position contacting the stationary valve seat portion 36 of the cap member 180, the tubular portion 232 is axially contracted under the pressure of the valve disc 86 with its upper end in close contact with the valve disc 86 so that both the upper end of the stationary valve seat portion 36 of the cap member and the upper end of the tubular portion 232 of the resilient valve seat member 228 are closed by the valve disc 86. When the valve disc 86 is raised from this position, communication is provided between the valve chamber 28 and the annular passageway 234 with the tubular portion 232 of the resilient valve seat member 228 kept closed at its upper end, as illustrated. The fluid in the valve chamber 28 is accordingly allowed to reach the cavity 30 in the valve casing 26 through the annular passageway 234, and the orifices 235 and the axial bore in the tubular portion 232 of the resilient valve seat member 228 at a fixed rate which is governed by the flow rates of fluid through the orifices 235 in the tubular portion 232. When the valve disc 86 is further moved upwardly and assumes a position spaced apart from the stationary valve seat portion 36 through a distance greater than the previously mentioned predetermined length, the valve disc 86 departs from the tubular portion 232 of the movable valve seat member 228 so that the fluid is passed from the valve chamber 28 to the cavity 30 in the casing 26 through the axial bore in the tubular portion 232 at a rate which varies proportionately with the space between the valve disc 86 and the upper end of the tubular portion 232. While the movable valve seat member in each of the movable valve seat means hereinbefore described with reference to FIGS. 8 to 12 is axially movable in its entirety under the influence of the biasing force constantly applied thereto, the movable valve seat member 228 of the arrangement shown in FIG. 13 is characterized in that the valve seat member is movable only in its tubular portion 232 and is operable without aid of extra biasing means because the tubular portion 232 per se has a spring action.

FIG. 14 illustrates part of still another modification of the valve unit shown in FIG. 8. The valve casing 26 is formed with an annular groove 236 surrounding the upper end portion of the cavity 30 in the casing 26. An annular disc member 238 is fixedly mounted on the casing 26 through the groove 236 and has a lower surface portion 240 defining the upper end of the cavity 30. The disc member 238 is formed with a central opening 242 which is axially aligned with the valve disc 86 which is movable upwardly and downwardly through the valve chamber 28 above the disc member 238. The casing 26 is further formed with a tubular portion 224 projecting upwardly from the bottom of the cavity 30 and having an open top end located slightly above the upper end of the opening 242 in the disc member 238, viz., above the plane on which the upper face of the disc member 238 is found, thereby forming an annular space between the outer peripheral surface of the tubular portion 244 and the inner circumferential edge of the disc member 238. The tubular portion 244 has an axial bore 246 in constant communication with the previously mentioned fluid outlet port 34 (FIG. 8) in the casing 26. The tubular portion 244 of the valve casing 26 thus constitutes a stationary valve seat portion. A movable valve seat member 248 has an annular flange portion 250 and a tubular portion 252 projecting upwardly from the inner circumferential end of the flange portion 228. The valve seat member 248 is axially movalby positioned relative to the valve casing 26 in such a manner that the flange portion 250 is located immediately below the above mentioned lower surface portion 240 of the disc member 238 and the tubular portion 252 is axially movable through the above mentioned annular space between the disc member 238 and the tubular portion 244 of the casing 26, as shown. An annular space or passageway 254 is thus formed between the outer peripheral surface of the tubular portion 244 of the casing 26 and the inner peripheral surface of the tubular portion 230 of the valve seat member 248. The tubular portion 252 of the valve seat member 248 is formed with a suitable number of orifices 256 through which constant communication is established between the valve chamber 28 and the above mentioned annular passageway 254. When the valve seat member 248 is moved upwardly and reaches an uppermost position having the flange portion 250 in contact with the lower surface portion 240 of the disc member 238, the tubular portion 252 of the valve seat member 248 projects upwardly from the opening 242 in the disc member 238 and has its open upper end located on a plane higher than the upper end of the tubular portion 244 of the casing 26 through a predetermined distance $d_3$. An annular diaphragm element 258 has its inner circumferential end portion secured to the lower face of the flange portion 250 of the valve seat member 248 and its outer circumferential end portion secured between the outer circumferential end portion of the disc member 238 and the valve casing 26. The diaphragm element 258 thus divides the carity 30 in the casing 26 into upper and lower compartments and supports the valve seat member 248 while allowing the valve seat member 248 to vertically move relative to the valve casing 26 and the disc member 238. The valve seat member 248 is biased upwardly by suitable biasing means such as a helical compression spring 260 which is seated between the valve seat member 248 and a wall surface portion of the casing 26 at the bottom of the cavity 30.

When, in operation, the valve disc 86 is moved downwardly against the force of the compression spring 260 and is brought into contact with the upper end of the tubular portion 244 of the casing 26, the axial bore 246 is isolated from the valve chamber 28 and the annular passageway 254 around the tubular portion 244 so that the fluid in the valve chamber 28 is not admitted into the bore 246 in the tubular portion 244 and accordingly into the fluid outlet port 34 (FIG. 8) in the valve casing 26. The valve unit is thus held in the zero-flow mode condition Z. When the valve unit is held in this condition, the movalbe valve seat member 248 is maintained in a position having the tubular portion 252 in contact with the valve disc 86 at its upper end and the flange portion 250 downwardly spaced apart a maximum distance from the lower surface portion 230 of the disc member 238. With the movable valve seat member 248 held in this position, the communication between the valve chamber 28 and the annular passageway 254 through the orifices 256 in the tubular portion 252 of the valve seat member 248 is established but does not extend into the bore 246 in the tubular portion 244 of the casing 26 with the upper end of the tubular portion 244 closed by the valve disc 86. The above mentioned maximum distance between the lower surface portion 218 of the disc member 238 and the flange portion 252 of the valve seat member 226 is equal to the previously mentioned predetermined distance $d_3$.

When the valve disc 86 is unseated from the upper end of the tubular portion 244 of the casing 26, communication is provided between the bore 246 in the tubular portion 244 and the annular passageway 254 around the tubular portion 22 through the space formed between the valve disc 86 and the upper end of the tubular portion 244. If, however, the distance of movement of the valve disc 86 from the upper end of the tubular portion 244 is smaller than the above mentioned predetermined distance $d_3$, the movable valve seat member 248 has its upper end held in contact with the valve disc 86 by reason of the biasing force exerted on the valve seat member 248 by the compression spring 260. The valve chamber 28 is therefore permitted to communicate with the bore 246 in the tubular portion 244 only through the orifices 256 and the annular passageway 254 with the upper end of the valve seat member 248 closed by the valve disc 86, as illustrated. Thus, the fluid in the valve chamber 28 is allowed to enter the bore 246 in the tubular portion 244 at a fixed rate which is predetermined by the flow rates of fluid through the orifices 256. The valve unit is in this fashion held in the constant-flow mode condition Y when the valve disc 86 is being moved toward or away from the upper end of the tubular portion 244 of the casing 26 through a distance smaller than the predetermined value $d_3$. When, however, the distance of movement of the valve disc 86 from the upper end of the tubular portion 244 becomes greater than the value $d_3$, the movable valve seat member 248 is brought to a stop with its flange portion 252 in contact with the lower surface portion 230 of the disc member 238 so that the valve disc 86 is unseated from the upper end of the valve seat member 248, allowing the bore 246 in the tubular portion 244 to communicate with the valve chamber 28 through the open upper end of the tubular portion 252 of the valve seat member 248. As a consequence, the fluid in the valve chamber 28 is allowed into the bore 246 in the tubular portion 244 at a rate which varies proportionately with the spacing between the valve disc 86 and the open upper end of the valve seat member 248. The valve unit is thus in the variable-flow mode condition X. The flow rate of fluid through the space between the valve disc 86 and the open upper end of the movable valve seat member 248 becomes maximum when the valve disc 86 reaches its uppermost position, causing the valve unit to assume the maximum-flow mode condition W.

FIG. 15 illustrates part of still another modification of the valve unit shown in FIG. 8. In the arrangement shown in FIG. 15, the valve disc 86 has a cavity 262 which is open through apertures 264 and 266 formed in the upper and lower wall portions, respectively, of the valve disc 86. The apertures 264 and 266 are axially aligned with the valve stem 88 projecting downwardly from the lower end of the plunger 84 of the solenoid-operated valve actuator 54 (FIG. 8). The valve disc 86 is further formed with at least one orifice 268 in either the upper wall portion as shown or the peripheral wall portion of the valve disc 86. An actuating rod projects downwardly from the lower end of the valve stem 88 into the cavity 262 through the aperture 264 in the upper wall portion of the valve disc 86 axially movably relative to the valve disc 86. The actuating rod 270 is connected at its lower end to an auxiliary valve disc 272 which is axially movable relative to the main valve disc 86 between positions contacting the respective inner faces of the upper and lower wall portions of the main valve disc 86. The distance of movement of the auxiliary valve disc 272 between these positions relative to the main valve disc 86 is assumed to be $d_4$ as shown. The main valve disc 86 is urged downwardly away from the valve stem 88 and accordingly the auxiliary valve disc 272 is biased toward the position contacting the inner face of the upper wall portion of the main valve disc 86 by suitable biasing means such as a helical compression spring which is seated at one end on the lower end of the valve stem 88 and at the other end on the upper face of the upper wall portion of the main valve disc 86 as shown.

When the plunger 84 of the solenoid operated valve actuator 54 (FIG. 8) is moved downwardly, the actuating rod 270 is downwardly moved relative to the main valve disc 86 against the opposing force of the preload spring 274 so that the auxiliary valve disc 272 is forced into contact with the inner face of the lower wall portion of the main valve disc 86. As the plunger 84 is further moved downward, the valve stem 88, actuating rod 270, main valve disc 86 and spring 274 are downwardly moved as a single unit until the main valve disc 86 is brought into contact with the valve seat portion 36 of the valve casing 26, as shown. Under these conditions, the upper end of the valve seat portion 36 of the casing 26 is closed by the main valve disc 86 and at the same time the aperture 266 in the lower wall portion of the main valve disc 86 is closed by the auxiliary valve disc 272 so that the cavity 30 in the valve casing 26 is completely isolated from the valve chamber 28, establishing the zero-flow mode condition Z in the valve unit.

When the plunger 84 (FIG. 8) is slightly moved upwardly from this condition, the auxiliary valve disc 272 is unseated from the inner face of the lower wall portion of the main valve disc 86 and allows the aperture 266 to open. Under these conditions, however, the main valve disc 86 is maintained in its position contacting the valve seat portion 36 of the casing 26 by the biasing force of the compression spring 274 so that the upper end of the valve seat portion 36 is kept closed by the main valve disc 86. The fluid in the valve chamber 28 is therefore directed to the cavity 30 in the casing 26 through the orifice 268, cavity 262 and aperture 266 in the main valve disc 86 at a rate which is dictated by the orifice 268. The valve unit is thus maintained in the constant-flow mode condition Y when the auxiliary valve disc 272 is upwardly spaced apart from the inner face of the lower wall portion of the main valve disc 86 through a distance smaller than the predetermined distance $d_4$. When the auxiliary valve disc 272 is moved through the distance $d_4$ from the inner face of the lower wall portion of the main valve disc 86 which has been held in contact with the valve seat portion 36 of the casing 26, the auxiliary valve disc 272 abuts to the inner face of the upper wall portion of the main valve disc 86. The main valve disc 86 is therefore moved upwardly from the valve seat seat portion 36 as the plunger 84 (FIG. 8) is further moved upwardly. The valve unit is now shifted from the constant-flow mode condition Y to the variable-flow mode condition X, allowing the fluid to be passed from the valve chamber 28 into the cavity 30 in the valve casing 26 at a rate which varies proportionately with the space between the valve seat portion 36 and the lower wall portion of the main valve disc 86 until the valve unit is shifted into the maximum-flow mode condition W.

While the fluid-flow control valve unit of each of the embodiments hereinbefore described has been assumed to be electrically controlled by the control unit 22 on the basis of the electric signal supplied from the signal generating means 24 (FIG. 3), the valve unit of the arrangement according to the present invention can be controlled in a mechanical, hydraulic or pneumatic fashion on the basis of any operational variable. FIG. 16 illustrates a preferred embodiment of a valve arrangement in which the control unit 22 incorporated into the gas-burning water heating device shown in FIG. 3 is operated on the basis of a signal in the form of fluid pressure representative of the temperature of water passed through the hot-water discharge pipe 6 (FIG. 3). In the arrangement shown in FIG. 16, the valve unit is shown, by way of example, to be constructed similarly to the valve mechanism of the valve unit illustrated in FIG. 8 with the solenoid-operated valve actuator 54 removed therefrom. As will be understood as the description proceeds, the control unit 22 and the signal generating means 24 of the arrangement illustrated in FIG. 16 is compatible with any of the valve units described with reference to FIGS. 5, 10, and 12 to 15.

Referring to FIG. 16, the control unit 22 comprises a hollow casing 276 having a closed upper wall portion 278 and an open lower end defined by an annular flange portion 280. The casing 276 is fixedly mounted on the valve casing 26 with the flange portion secured to the top flange portion 38 of the valve casing 26 by suitable fastening means such as the bolts or screws 50 with the annular sealing element 44 and the apertured partition plates 46 and 48 interposed therebetween. The apertures 52 in the partition plates 46 and 48 are closed and accordingly the valve chamber 28 below the partition plate 46 is hermetically isolated by the diaphragm element 90 from which the valve stem 88 downwardly projects for connection to the valve disc 86 as previously described with reference to FIG. 8. A plunger 282 is connected at one end to the upper end of the valve stem 88 and projects upwardly into the space in the hollow casing 276. The plunger 282 is axially aligned with the valve stem 88 and the valve disc 86 within the valve chamber 28 in the valve casing 26.

The control unit 22 of the arrangement shown in FIG. 15 further comprises a bellows assembly 284 consisting of an axially contractable and extensible tubular portion 286 of a resilient material such as rubber and rigid end plates 288 and 290 to which the tubular portion 286 is connected at its opposite ends. The bellows assembly 284 is mounted within the hollow casing 276 with one end plate 288 fixedly attached to the inner face of the upper wall portion 278 of the casing 276 and with the tubular portion 286 depending downwardly from the end plate 288. An actuating rod 292 projects downwardly from the lower end plate 290, terminating above the partition plate 48 and sidewise of the plunger 282. The actuating rod 292 is formed with an opening 294 having a center axis substantially perpendicular to the axis of the rod 292. A control lever 296 is pivotally connected at one end to the hollow casing 276 by a pin 298 having a substantially horizontal axis constituting a fulcrum point. The control lever 296 is rotatable about the axis of the pin 298 in a vertical plane within the hollow casing 276. The control lever 296 is passed through the opening 294 in the actuating rod 292 and has an elongated slot 300 formed in its end portion opposite to the pin 298. A retaining pin 302 projects horizontally from a top portion of the plunger 282 and is movably received in the elongated slot 300 in the control lever 296. The opening 294 in the actuating rod 292 is sized to allow vertical movement of the control lever 296 relative to the rod 292 through a limited distance. A preloaded helical tension spring 304 is anchored at one end to a projection 306 on the inner peripheral surface of the casing 276 and at the other end to a spring retaining pin 308 which is secured to the control lever 296 at a point intervening between the pivoltal pin 298 and the opening 294 in the actuating rod 292. The tension spring 304 is thus arranged to provide a snap action biasing the the control lever 296 to turn clockwise or counterclockwise about the pivotal pin 298 from a predetermined neutral position indicated by phantom lines depending upon the position of the axial actuating rod 292 relative to the hollow casing 276.

The bellows assembly 284 is in communication through a capillary tube 310 with a temperature-sensing bulb 312 which is heat conductively in contact with the hot-water discharge pipe 6 of the water heating device illustrated in FIG. 3. The bellows assembly 284, capillary tube 310 and temperature-sensing bulb 312 are filled with suitable highly expansible fluid such as mercury or nitrogen gas under pressure. The capillary tube 310 and the temperature-sensing bulb 312 constitute in combination the signal generating means 24 mentioned with reference to FIG. 3.

When, now, the temperature of the water transferred from the hot-water discharge pipe (FIG. 3) is higher than a predetermined level (which corresponds to the critical level Tq indicated in FIG. 4), the bellows assembly 284 is axially expanded and the actuating rod 292 is moved downwardly. This causes the control lever 296 to turn about the pivotal pin 298 counterclockwise of the drawing against the force of the tension spring 306 urging the control lever 296 to turn clockwise of the drawing. The control lever 296 thus forces the plunger 282 and accordingly the valve disc 86 downwardly against the opposing force of the helical compression spring 200 with the movable valve seat member 192 held in contact with the valve disc 86 as shown. When the control lever 296 is turned about the pivotal pin 298 beyond the neutral position indicated by the phantom lines, the control lever 296 is urged by the tension spring 304 to turn counter-clockwise of the drawing so that the valve disc 86 is moved to contact and forced against the stationary valve seat portion 36 of the valve casing 26. The communication between the valve chamber 28 and the cavity 30 in the casing 26 is therefore blocked by the valve disc 86 closing the upper ends of the valve seat portion 36 and the movable valve seat member 188, establishing the zero-flow mode condition Z in the valve unit. When the temperature of the water transferred to the temperature sensing bulb 312 is reduced from the above mentioned predetermined level, the bellows assembly 284 is axially contracted so that the actuating rod 292 is moved upwardly. The control lever 304 is caused to turn clockwise of the drawing against the opposing force of the tension spring 304 and causes the plunger 282 and accordingly the valve disc 86 to move upwardly away from the stationary valve seat portion 36 of the cap member 180. The upper end of the stationary valve seat portion 36 is therefore allowed to open and provides communcation between the valve chamber 28 and the cavity 30 in the casing 26 through the annular passageway 194 and the orifices 196 so that the fluid in the valve chamber 28 is passed into the cavity 30 at a fixed rate which is dictated by the flow rates of fluid through the orifices 196 as previously described with reference to FIG. 9B with the upper end of the movable valve seat member 188 kept closed by the valve disc 86. The valve unit is thus maintained in the constant-flow mode condition Y. As the hot water temperature detected by the temperature sensing bulb 312 is further reduced and reaches a predetermined level (which corresponds to the critical level Tp indicated in FIG. 4), the bellows assembly 284 is axially contracted to such an extent as to cause the control lever 296 to turn clockwise of the drawing past the neutral position so that the control lever 296 is biased to turn clockwise about the pivotal pin 298 by the tension spring 304. The valve valve disc 86 is therefore moved upwardly and is unseated from the movable valve seat member 188 which is moved into its uppermost position having the flange portion 190 in contact with the lower surface portion 282a of the stationary valve seat portion 282 of the cap member 180. The valve unit is now shifted from the constant-flow mode condition Y into the variable-flow mode condition X allowing the fluid to be passed from the vavle chamber 28 to the cavity 30 in the casing 26 through the axial bore in the movable valve seat member 188 at a rate which varies proportionately with the space formed between the valve disc 86 and the open upper end of the movable valve seat member 188, viz., with the volume of the bellows assembly 284.

While the embodiments of the valve arrangement according to the present invention as hereinbefore described are adapted to provide the different modes of operation in a single valve unit, substantially the same results can be achieved by the use of a series combination of two valve units, a preferred embodiment of such a nature being illustrated in FIG. 17.

Referring to FIG. 17, the valve arrangement is shown to be incorporated into a gas-burning water heating device arranged similarly to the device illustrated in FIG. 3 and comprises a series combination of a proportioning valve unit 16a and an on-off or two-position valve unit 16b provided between the proportioning valve unit 16a and the previously mentioned flow shut-off valve unit 14. The proportioning valve unit 16a is bypassed by a bypass passageway 16c which is calibrated to provide the previously mentioned fixed flow rate Fc (FIG. 4). The proportioning valve unit 16a is arranged to provide a flow rate which is variable between zero and a maximum value $f_m$ which is assumed to be equal to the difference between the previously mentioned flow rate Fm and the fixed flow rate Fc. The control unit 22 is adapted to operate the proportioning valve unit 16a in such a manner that the flow rate of fuel gas therethrough is varied between zero and the above mentioned maximum value $f_m$ in proportion to the hot water temperature detected by the signal generating means 24 when the detected temperature is lower than a predetermined level which is assumed to be the first critical level Tp mentioned with respect to the graph of FIG. 4. On the other hand, the two-position valve unit 16b is operated by the control unit 22 so as to be open when the detected hot water temperature is lower than a predetermined level which is assumed to be the previously mentioned second critical level Tq.

When, thus, the temperature of hot water detected by the signal generating means 24 is lower than the first critical level Tp with both of the flow shut-off valve unit 14 and the two-position valve unit 16b kept open, the proportioning valve unit 16a passes fuel gas therethrough at a rate which is varied in proportion to the temperature of hot water as detected by the signal generating means 24. The fuel gas is therefore supplied to the gas burning unit 10 at a rate which is equal to the sum of the variable flow rate through the proportioning valve unit 16a and the fixed flow rate Fc through the bypass passageway 16c and which varies with the flow rate through the proportioning valve unit 16a between the value Fc as a minimum and the maximum value Fm which is the sum of the values Fc and $f_m$. The valve arrangement is thus maintained in the variable-flow mode condition X which is graphically indicated in FIG. 4. If the hot water temperature detected by the signal generating means 24 exceeds the first critical level Tp, the proportioning valve unit 16a is closed and as a consequence the fuel gas is supplied to the gas burning unit 10 at the fixed rate Fc dictated by the bypass passageway 16c with the two-position valve unit 16b kept open. The valve arrangement is thus held in the constant-flow mode condition Y. When the temperature of hot water detected by the signal generating means 24 reaches the second critical level Tq, the two-position valve unit 16b is closed under the control of the control unit 22 so that the supply of fuel gas to the gas burning unit 10 is interrupted, establishing the zero-flow mode condition Z in the valve arrangement.

The valve unit 16a and 16b and the control unit 22 to achieve the above described functions may be easily designed by those skilled in the art and, for this reason, practical examples thereof are not herein illustrated. By way of example, the proportioning valve unit 16a may be constructed similarly to the valve unit shown in FIG. 5.

Each of the valve arrangements embodying the present invention has been described to be incorporated into a gas-burning water heating device but the valve arrangement according to the present invention will find various applications. FIGS. 18 and 19 show examples in which the valve arrangements embodying the present invention are used in a steam boiler and a space heating appliance, respectively. In FIG. 18, the steam boiler is shown to comprise a boiling chamber 310 and a gas burning unit 312 positioned below the boiling chamber 310. Water is directed into the boiling chamber 310 through a water feed pipe 314 arranged with a one-way check valve 316 and the steam of hot water produced in the boiling chamber 310 is discharged through steam discharge pipes 318 each arranged with a one-way check valve 320. The valve arrangement embodying the present invention is used to control the rate of supply of fuel gas to the gas burning unit 312 on the basis of a signal produced by the signal generating means 24 which is assumed to be sensitive to the pressure of water vapor in the boiling chamber 310. The signal thus produced by the signal generating means 24 is fed to the control unit 22 which operates the valve unit 16 between the maximum-flow, variable-flow, constant-flow and zero-flow mode conditions depending upon the detected pressure of vapor pressure in the boiling chamber 310 so as to maintain the vapor pressure at a substantially fixed level.

Turning to FIG. 19, the space heating appliance is shown to comprise an infrared-ray source consisting of a ceramic grid 322 positioned over a gas burning unit 324 within a casing 326. The signal generating means 24 comprises an infrared-ray sensing element (not shown) located in the neighborhood of the ceramic grid 322 for producing a signal representative of the amount of infrared rays radiated from the infrared source. The signal thus produced by the signal generating means 24 is fed to the control unit 22 which operates the valve unit 16 to control the flow of fuel gas to be supplied to the gas burning unit 324 in such a manner as to maintain constant the amount of infrared rays generated in the ceramic grid 322.

What is claimed is:

1. A multiple-mode fluid-flow control valve arrangement comprising a valve casing having first and second fluid ports, a valve chamber in constant communication with the first fluid port, and having a cavity located between the valve chamber and the second fluid port; a stationary valve seat wall which is fixedly located between said valve chamber and said cavity and which axially projects a predetermined length into the valve chamber and has a valve seat end located within the valve chamber; a member having a generally tubular movable valve seat portion positioned substantially in coaxial relationship with said stationary valve seat wall and having a valve seat adjacent to the valve seat end of the stationary valve seat wall, said movable valve seat portion being axially movable in part within said cavity and in part into said valve chamber between a first limit axial position having its valve seat end located substantially flush with the valve seat end of the stationary valve seat wall and a second limit axial position projecting a maximum length beyond the valve seat end of the stationary valve seat wall, said member having at least one aperture for providing restricted communication between said valve chamber and said second fluid port when said movable valve seat portion is in an axial position between said first and second limit axial positions thereof; a valve element axially movable within said valve chamber toward and away from the respective valve seat ends of the stationary valve seat wall and said movable valve seat portion and having a zero-flow mode position seated on both of the stationary valve seat wall and the movable valve seat portion and having the movable valve seat portion held in said first limit axial position thereof, a constant-flow mode position range unseated from the stationary valve seat wall but seated on the movable valve seat portion in a position between said first and second limit axial positions thereof, and a variable-flow mode position range unseated from both of the stationary valve seat wall and the movable valve seat portion and allowing the movable valve seat portion to stay in said second limit axial position thereof; at least partially flexible partition means secured to said valve casing for isolating said valve chamber and said second fluid port from each other but providing said restricted communication therebetween through said aperture when said valve element is in said constant-flow mode position range; biasing means urging said movable valve seat portion to axially project into said valve chamber; stop means fast on said valve casing for limiting the axial displacement of the movable valve seat portion into the valve chamber to said second limit axial position of the valve seat portion; and solenoid-operated valve actuating means operative to move said valve element toward the valve seat of said stationary valve seat wall over a distance which is continuously variable with the magnitude of an electric signal supplied to a solenoid actuator thereof.

2. A multiple-mode fluid-flow control valve arrangement comprising a valve casing having first and second fluid ports, a valve chamber in contact communication with the first fluid port, and having a cavity located between the valve chamber and the second fluid port; a stationary valve seat wall which is fixedly located between said valve chamber and said cavity and which axially projects a predetermined length into the valve chamber and has a valve seat end located within the valve chamber; a member having a generally tubular movable valve seat portion which is radially inwardly spaced apart from said stationary valve seat wall for forming an open space between the stationary valve seat wall and the movable valve seat portion and which has a valve seat end adjacent to the valve seat end of said stationary valve seat wall, said movable valve seat portion being axially movable in part within said cavity and in part into said valve chamber between a first limit axial position having its valve seat end substantially flush with the valve seat end of the stationary valve seat wall and a second limit axial position projecting a maximum length beyond the valve seat end of the stationary valve seat wall, said member having at least one aperture providing constant, restricted communication between said open space and said second fluid port; a valve element axially movable within said valve chamber toward and away from the respective valve seat ends of the stationary valve seat wall and the movable valve seat portion and having a zero-flow mode position seated on both of the stationary valve seat wall and the movable valve seat portion and having the movable valve seat portion held in said first limit axial position thereof for thereby closing said open space at the respective valve seat ends of the stationary valve seat wall and the movable valve seat portion, a constant-flow mode position range unseated from the stationary valve seat wall but seated on the movable valve seat portion in a position between said first and second limit axial positions thereof for thereby allowing said open space to open to said valve chamber, and a variable-flow mode position range unseated from both of the stationary valve seat wall and the movable valve seat portion and allowing the movable valve seat portion to stay in said second limit axial position thereof for thereby allowing said cavity to open in its entirety to said valve chamber; at least partially flexible partition means secured to said valve casing for isolating said open space and said second fluid port from each other but providing said restricted communication therebetween through said aperture when said valve element is in said constant-flow mode position range; biasing means urging said movable valve seat portion to axially project into said valve chamber; stop means fast on said valve casing for limiting the axial displacement of the movable valve portion into the valve chamber to said limit axial position of the valve seat portion; and solenoid-operated valve actuating means operative to move said valve element toward the valve seat end of said stationary valve seat wall over a distance which is continuously variable with the magnitude of an electric signal supplied to a solenoid actuator thereof.

3. A multiple-mode fluid-flow control valve arrangement as set forth in claim 2, in which said partition means comprises a flexible diaphragm secured to said valve casing and said member and dividing said cavity into a first variable-volume compartment containing said open space and a second variable-volume compartment which is in constant communication with said second fluid port, said aperture in said member providing constant, restricted communication between the first and second variable-volume compartments.

4. A multiple-mode fluid-flow control valve arrangement as set forth in claim 3, in which said biasing means comprises a spring element positioned within said second variable-volume compartment and having substantially concentric inner and outer annular portions radially spaced apart from each other and a plurality of radial portions interconnecting said inner and outer annular portions, said inner annular portion being secured to said member and said outer annular portion being secured along an outer circumference to said valve casing, said radial portions being warped away from said first variable-volume compartment and urging said inner annular portion toward the first variable-volume compartment and thereby said member toward said valve chamber.

5. A multiple-mode fluid-flow control valve arrangement as set forth in claim 2, in which said partition means comprises a flexible, generally tubular element secured at one axial end thereof to said member and axially extending within said cavity in a direction opposite to said valve seat end of the movable valve seat portion of the member, said tubular element and said movable valve seat portion having respective axial bores contiguous to each other, and a casing fixedly positioned within said cavity and enclosing said tubular element therewithin, said tubular element being secured at the other axial end thereof to said casing, and said casing defining within said cavity a first variable-volume compartment containing said open space and said tubular element therewithin and a second variable-volume compartment in constant communication with said second fluid port and to which the axial bore of said tubular element is open at said other axial end of the tubular element, said casing having at least one aperture providing constant, restricted communication between said first and second variable-volume compartments.

6. A multiple-mode fluid-flow control valve arrangement as set forth in claim 2, in which said member comprises a unitary, resilient element having in addition to said movable valve seat portion, generally tubular portions positioned in part within said cavity and in part within said stationary valve seat wall and bodily constituting said biasing means and said stop means, and a flange portion at the opposite axial end of the resilient element to said movable valve seat portion, said flange portion being secured to said valve casing and constituting said partition means, said resilient element having an axial bore in constant, restricted communication with said open space through said aperture and in constant communication with said second fluid port, said aperture in said movable valve seat portion, the tubular portions of said resilient element being bodily deformable and thereby capable of having said movable valve seat portion movable between said first and second limit axial positions and urged to axially project into said valve chamber by the elasticity of the resilient element.

7. A multiple-mode fluid-flow control valve arrangement comprising a valve casing having first and second fluid ports, a valve chamber in constant communication with the first fluid ports, and a cavity located between the valve chamber and the second fluid port; a stationary valve seat wall fixedly located between said valve chamber and said cavity and which axially projects a predetermined length into the valve chamber and has a valve seat end located within the valve chamber; a movable valve seat member having a generally tubular portion positioned substantially in concentrical relationship to said stationary valve seat wall and which has a valve seat end adjacent to the valve seat end of the stationary valve seat wall, said movable valve seat member being axially movable in part within said cavity and in part into said valve chamber between a first limit axial position having its valve seat end located substantially flush with the valve seat end of the stationary valve seat wall and a second limit axial position projecting a maximum length beyond the valve seat end of the stationary valve seat wall, said movable valve seat member having at least one aperture for providing restricted communication between said valve chamber and said second fluid port when said movable valve seat member is in an axial position between said first and second limit axial positions thereof; a valve element axially movable within said valve chamber toward and away from the respective valve seat ends of the stationary valve seat wall and the movable valve seat member and having a zero-flow mode position seated on both of the stationary valve seat wall and the movable valve seat member and having the movable valve seat member held in said first limit axial position thereof, a constant-flow mode position range unseated from the stationary valve wall but seated on the movable valve seat member in a position between said first and second limit axial positions thereof, and a variable-flow mode position range unseated from both of the stationary valve seat wall and the movable valve seat member and allowing the movable valve seat member to stay in said second limit axial position thereof; at least partially flexible support means positioned within said cavity and secured to said valve casing and said movable valve seat member for having the movable valve seat member axially movable supported within said cavity, said support means being effective to isolate said valve chamber and said second fluid port from each other but providing said restricted communication therebetween through said aperture when said valve element is in said constant-flow mode position range; biasing means urging said movable valve seat member to project into said valve chamber; stop means fast on said valve casing for limiting the axial displacement of the movable valve seat member to said second limit axial position; and solenoid-operated valve actuating means operative to move said valve element toward the valve seat end of said stationary valve seat wall over a distance which is continuously variable with the magnitude of an electtric signal supplied to a solenoid actuator thereof.

8. A multiple-mode fluid-flow control valve arrangement as set forth in claim 7, in which said tubular portion of said movable valve seat member is radially inwardly spaced apart from said stationary valve seat wall defining an open space between the stationary valve seat wall and the tubular portion of the movable valve seat member and in which said tubular portion has an axial bore extending between the opposite axial ends of the tubular portion, said support means defining within said cavity a first variable-volume compartment enclosing said movable valve seat member and containing said open space and a second variable-volume compartment constantly in communication with said second fluid port and said axial bore in said tubular portion of the movable valve seat member.

9. A multiple-mode fluid-flow control valve arrangement as set forth in claim 8, in which said support means comprises a unitary flexible diaphragm secured to said valve casing and said movable valve seat member, said first and second variable-volume compartments being separated from each other by said diaphragm and said movable valve seat member and being in constant, restricted communication with each other through said aperture in said movable valve seat member.

10. A multiple-mode fluid-flow control valve arrangement as set forth in claim 8, in which said support means comprises a flexible, generally tubular member secured at one axial end thereof to said movable valve seat member and axially extending within said cavity in a direction opposite to said valve seat end of the movable valve seat member, the tubular member having an axial bore open at both axial ends and contiguous at one of the ends to the axial bore of said movable valve seat member, and a casing fixedly positioned within said cavity and enclosing said movable valve seat member and said tubular member therewithin, the tubular member being secured at the other axial end thereof to the casing, said tubular member and said casing defining within said cavity a first variable-volume compartment surrounding the movable valve seat member and the tubular member and containing said open space and a second variable-volume compartment which surrounds part of said casing and which is in constant communication with said second fluid port, said tubular member being open at the other of said axial ends thereof to said second variable-volume compartment, said casing having at least one aperture providing constant communication between the first and second variable-volume compartments.

11. A multiple-mode fluid-flow control valve arrangement as set forth in claim 7, in which said stationary valve seat wall axially extends throughout said cavity into said valve chamber and has an axial bore open at said valve seat end of the stationary valve seat member and in constant communication with said second fluid port and in which said tubular portion of said movable valve seat member is radially outwardly spaced apart from said stationary valve seat wall, said movable valve seat member having said aperture adjacent the valve seat end of the member.

12. A multiple-flow fluid-flow control valve arrangement comprising a valve casing having first and second fluid ports, a valve chamber in constant communication with the first fluid port, and a cavity located between the valve chamber and the second fluid port; a stationary valve seat wall fixedly located between said valve chamber and said cavity and which axially projects a predetermined length into said valve chamber and has a valve seat end located within the valve chamber; a resilient member consisting of a generally tubular portion positioned within said cavity and extending axially toward said valve chamber, the tubular portion having a valve seat end located adjacent said valve seat end of said stationary valve seat wall and an axial bore in constant communication with said second fluid port, and a flange portion at the opposite axial end of the tubular portion to said valve seat end of the tubular portion, said flange portion being secured to said valve casing, said tubular portion being resiliently deformable in an axial direction between a first condition having said valve seat end of the portion located substantially flush with the valve seat end of said stationary valve seat wall and a second condition having the tubular portion projecting a maximum length beyond the valve seat end of the stationary valve seat wall, said resilient member having at least one aperture adjacent the valve seat end of the portion for providing communication between said valve chamber and said axial bore in the tubular portion when the tubular portion is in a condition between said first and second conditions thereof; a valve element axially movable within said valve chamber toward and away from the respective valve seat ends of the stationary and having a zero-flow mode position seated on both of the stationary valve seat wall and the tubular portion of said resilient member with the tubular portion held in said first condition thereof, a constant-flow mode position range unseated from the stationary valve seat wall but seated on the tubular portion of said resilient member in a condition between said first and second conditions thereof, and a variable-flow mode position range unseated from both of the stationary valve seat wall and the tubular portion of said resilient member and allowing said tubular portion of the resilient member in said second condition thereof; and solenoid-operated valve actuating means operative to move said valve element toward the valve seat end of said stationary valve seat wall over a distance which is continuously variable with the magnitude of an electric signal supplied to a solenoid actuator thereof.

* * * * *